US011723300B2

(12) United States Patent
Harmon et al.

(10) Patent No.: US 11,723,300 B2
(45) Date of Patent: Aug. 15, 2023

(54) RUN SELECTOR APPARATUS AND RUN SELECTOR BIASING SYSTEM

(71) Applicant: Deere & Company, Moline, IL (US)

(72) Inventors: Andrew W. Harmon, Davenport, IA (US); Derryn Pikesh, Geneseo, IL (US)

(73) Assignee: Deere & Company, Moline, IL (US)

( * ) Notice: Subject to any disclaimer, the term of this patent is extended or adjusted under 35 U.S.C. 154(b) by 387 days.

(21) Appl. No.: 16/943,191

(22) Filed: Jul. 30, 2020

(65) Prior Publication Data

US 2022/0030761 A1    Feb. 3, 2022

(51) Int. Cl.

| | | |
|---|---|---|
| *A01C 7/06* | (2006.01) | |
| *A01B 79/00* | (2006.01) | |
| *A01C 7/20* | (2006.01) | |
| *A01C 21/00* | (2006.01) | |
| *F16K 11/14* | (2006.01) | |

(52) U.S. Cl.
CPC .............. *A01C 7/06* (2013.01); *A01B 79/005* (2013.01); *A01C 7/208* (2013.01); *A01C 21/005* (2013.01); *F16K 11/14* (2013.01)

(58) Field of Classification Search
CPC ......... A01C 7/06; A01C 7/208; A01C 21/005; A01C 7/00; A01C 7/20; A01C 21/00; A01B 79/005; A01B 79/00; F16K 11/14; F16K 11/10; F16K 11/00
See application file for complete search history.

(56) References Cited

U.S. PATENT DOCUMENTS

| | | |
|---|---|---|
| 8,915,200 B2 | 12/2014 | Barsi et al. |
| 9,578,801 B2 | 2/2017 | Barsi et al. |

FOREIGN PATENT DOCUMENTS

| | | |
|---|---|---|
| DE | 272730 C | 4/1914 |
| EP | 0309608 A2 | 4/1989 |
| EP | 3225093 A1 | 10/2017 |

OTHER PUBLICATIONS

Extended European Search Report and Written Opinion issued in European Patent Application No. 21184837.9, dated Dec. 14, 2021, in 11 pages.

*Primary Examiner* — Christopher J. Novosad
(74) *Attorney, Agent, or Firm* — Tucker Ellis LLP

(57) ABSTRACT

A biasing system for use with an associated run selector device includes a valve body member movable within a housing between opposite first and second run selection positions selecting respective first and second commodity distribution runs of the associated run selector device. The biasing system includes a first biasing element on the housing, and a second biasing element on the valve body member. The first and second biasing elements are movable relative to each other between opposite first and second biasing system positions together with the associated valve body member being moved relative to the housing between the opposite first and second run selection positions. The first and second biasing elements are mutually biased against each other to urge each other apart and towards a one or the other of the opposite first and second biasing system positions.

15 Claims, 21 Drawing Sheets

RUN SELECTOR APPARATUS AND RUN SELECTOR BIASING SYSTEM

FIELD OF THE DISCLOSURE

The embodiments herein are directed to aspects of run selector systems and run selector control mechanisms. Although the example embodiments will be described as systems and control mechanisms for use in biasing various mechanisms of a bank of commodity run selector systems used for directing commodities such as seeds and fertilizers to selected commodity distribution runs in a work cart such as an agricultural seeder or the like, it is to be appreciated that the embodiments are not limited to those particular uses or applications, and instead may be used anywhere there is a need to bias a valve body in a valve housing of a valve device to ensure that it is in a desired position regardless of the position of other valves in a bank of valve devices linked for position control by a common link member.

BACKGROUND

Commodities such as seeds or fertilizers may be conveyed from tanks on a towed cart holding the commodities to distribution points beyond the cart by dosing the commodity into a moving stream of a fluid such as air flowing in a commodity delivery run where the seed, fertilizer, or the like any other commodity may be carried to the remote distribution points coupled with the commodity delivery run.

Sometimes it is useful to have more than one commodity, or more than one delivery run, or more than one commodity and more than one delivery run. Run selector devices have been developed to couple commodity tanks with multiple delivery runs so that the delivery run connecting the commodity in the tanks with the distribution points of the commodity runs may be selectable based on factors such as the type of the commodity, the operational characteristics of the delivery run and/or its distribution points, or the like.

Typical run selector devices are provided as commodity valve devices having an input port, a valve body disposed within a valve housing of the run selector device, and first and second output ports. The valve body is movable such as by pivoting or rotating the valve body between positions relative to the housing for porting the commodity entering the input port to a respective selected output port. The output ports of the run selector device are typically each coupled with respective conduits, and each conduit is in turn coupled with a corresponding different first or second commodity run system or bank. In this way, the movement of the valve body to a first position relative to the valve housing routes the commodity from the single input port to the first run system or bank, and movement of the valve body to a second position relative to the valve housing routes the commodity from the single input port to the second run system or bank.

In addition and for efficiency, multiple such run selector devices are provided for each such commodity tank to increase the volume of commodity distributed from the tank, and control of the multiple devices is typically replicated for their operation in parallel. In that way, a commodity in a tank may be simultaneously distributed through multiple replicated run selector devices that are operated in parallel, so that the commodity may be routed though the multiple run systems for high volume and efficient handling of the commodity. To do this, valve bodies of the multiple run selector devices are coupled together and controlled in parallel by a linkage mechanism that spans the multiple run selector devices to select, simultaneously for each of the run selector devices, either the first set of commodity runs for distribution of the commodity into the first run system or bank or the second set of commodity runs for the distribution into the second run system or bank based on the position of the valve bodies as set by the linkage mechanism spanning the selector devices.

The above system has met with some success because a user need only move a single linkage mechanism such as a drag link or the like to operate the multiple run selector devices in unison, thereby providing a fast and easy way to set up a commodity cart to distribute product from a tank to a selected commodity bank having plural parallel commodity runs. The shared control mechanism offers ease of use in selecting the desired positions of multiple commodity distribution valve devices simultaneously, and it also provides the advantage of applying a basic closure or holding force to each of the valve bodies relative to inner walls of their respective valve housings simultaneously.

However, an obstruction that may occur in only a single valve body in any of the run selector devices that are linked by the shared control mechanism, such as may be caused by the commodity clogging within one of the run selector device housings between an edge of a valve body and an inner wall of a housing of the valve body, may prevent full movement of all of the valve bodies in all of the run selector devices including the other non-obstructed run selector devices by virtue of the control linkage mechanism being coupled between all of the devices. The position of a valve body prevented from movement to full closure against an inner wall of the valve housing by a clog may, in effect, be reproduced or otherwise replicated in all of the other valves that are operated in parallel even though they may not be clogged. The problem presents as an incomplete rotation or a lifting off from the inner walls of the valve devices without the commodity clog. In addition, valve bodies that are not moved completely into designated full travel positions can result in the commodity entering into the non-selected distribution runs, and may also result in an undesirable fluid pressure cross-talk between the selected and the non-selected distribution run systems or banks.

It is therefore desirable to provide commodity run selector device bank control linkage systems and methods having a predetermined amount of backlash provided or otherwise "built-in" between a common drag link coupling the commodity run selector device bank and each of the valve bodies of the run selector devices within the bank so that an obstruction in one or more of the run selector devices of the bank does not adversely affect the full travel or movement of any of the other valve bodies of the other run selector devices without the obstruction.

It is therefore also desirable to provide systems and methods for biasing valve bodies of run selector devices into one or the other opposite position relative to a valve housing of the run selector device to help to seal run selector devices that might otherwise be compromised due to an obstruction of commodity or the like being lodged between an operational edge of the valve body and an inner wall of the valve housing. In that way, each of the individual run selector devices would be able to move independently of the other run selector devices to the desired position in systems using bank control linkage systems and methods having a predetermined amount of backlash.

It is therefore still further desirable to provide commodity run selector device bank control linkage systems and methods having a predetermined amount of backlash provided or otherwise "built-in" between a common drag link coupling the commodity run selector device bank and each of the valve bodies of the run selector devices within the bank, and further to provide systems and methods for biasing valve bodies of run selector devices into one or the other opposite position relative to a valve housing of the run selector device so that an obstruction in one or more of the run selector devices does not adversely affect the full travel or movement of any of the other valve bodies of the other run selector devices, and to help to seal run selector devices that might otherwise be compromised due to an obstruction of commodity or the like being lodged between the operative edge of the valve body and the inner wall of the valve housing.

SUMMARY

The embodiments herein provide for new and improved systems and methods for biasing valve body members of valve devices in the form of run selector devices into one or the other opposite position relative to a valve housing of the run selector device to help to fully move the run selector devices into one or the other opposite position relative to a valve housing of the run selector device, and to help to seal an operative edge of a valve body member of a commodity valve with an inner wall of the valve housing. In that way, run selector devices that might otherwise be compromised due to an obstruction of the commodity or the like being lodged between the operative edge of the valve body member and the inner wall of the valve housing of another run selector device may be properly sealed.

The embodiments herein further provide for new and improved commodity run selector device bank control linkage systems and methods having a predetermined amount of backlash provided or otherwise "built-in" between a common drag link coupling the commodity run selector device bank and each of the valve body members of the valve devices in the form of run selector devices within the bank so that an obstruction in one or more of the run selector devices does not adversely affect the full travel or movement of any of the other valve bodies of the other run selector devices.

The embodiments herein still further provide for new and improved commodity run selector device bank control linkage systems and methods having a predetermined amount of backlash provided or otherwise "built-in" between a common drag link coupling the commodity run selector device bank and each of the valve bodies of the valve devices in the form of run selector devices within the bank and, further, new and improved systems and methods for biasing valve bodies of run selector devices into one or the other opposite position relative to a valve housing of the run selector device so that an obstruction in one or more of the run selector devices does not adversely affect the full travel or movement of any of the other valve bodies of the other run selector devices, and to help to seal run selector devices that might otherwise be compromised due to an obstruction of commodity or the like being lodged between the operative edge of the valve body member and the inner wall of the valve housing.

In accordance an aspect, a biasing system is provided for use with an associated valve device in the form of a run selector device having a valve body member movable within a housing between opposite first and second run selection positions selecting respective first and second commodity distribution runs of the associated run selector device. The biasing system includes a first biasing element on the housing, and a second biasing element on the valve body member. The first and second biasing elements are movable relative to each other between opposite first and second biasing system positions together with the associated valve body member being moved relative to the housing between the opposite first and second run selection positions. The first and second biasing elements are mutually biased against each other to urge each other apart and towards a one or the other of the opposite first and second biasing system positions.

In accordance with a further aspect, a valve device in the form of a run selector system is provided including a housing having an input port and first and second output ports, a valve body member disposed in the housing, an interface device, and a control arm member operatively coupled with the valve body member by the interface device for moving the valve body member. The valve body member includes a valve body member moveable between opposite first and second run selection positions relative to the housing, the valve body member in the first run selection position relative to the housing defining a first fluid circuit comprising the input port opened to the first output port and closed to the second output port, and the valve body member in the second run selection position relative to the housing defining a second fluid circuit comprising the input port closed to the first output port and opened to the second output port. The control arm member moves the valve body member between the first and second run selection positions relative to the housing. The control arm member is movable between opposite first and second control arm positions corresponding respectively to the first and second run selection positions of the valve body member. The interface device includes a first interface element on the valve body member, a second interface element on the control arm member, and a resilient member disposed between the first and second interface elements, wherein the resilient member is selectively compressible between the first and second interface elements to permit limited relative movement between the control arm member and the valve body member. The interface device compressed between the first interface element and the second interface element holds the valve body member in either one of the opposite first and second run selection positions relative to the housing.

In accordance with a still further aspect, a valve device in the form of a run selector device self-compensated for obstructions is provided. The run selector device includes a valve housing, and a valve member disposed in the housing. The valve housing includes a housing body defining an input port for conducting an input fluid flow into the housing body, a first output port in fluid communication with the input port for conducting the input fluid flow out of the housing as a first output fluid flow, and a second output port in fluid communication with the input port for conducting the input fluid flow out of the housing as a second output fluid flow. The valve member defines a valve body having a proximal end pivotable about a pivot axis between opposite first and second positions for porting the input fluid flow to the first and second output ports, respectively, of the housing body, and a distal end sealing the valve body against opposite first and second surfaces of the housing body for the valve body being disposed in the opposite first and second positions, respectively, wherein the distal end of the valve body comprises a flexible portion extending along an edge of the valve body.

In accordance with a further aspect, a biasing system is provided for use with a valve device in the form of a run selector system including a housing having an input port and first and second output ports and a valve body member disposed in the housing. The biasing system includes a first biasing element on the housing of the associated run selector device; and a second biasing element on the valve member of the associated run selector device. The first and second biasing elements are movable relative to each other between opposite first and second biasing system positions together with the associated valve member being moved relative to the housing between the opposite first and second run selection positions. The first and second biasing elements are mutually biased against each other to urge each other apart and towards a one or the other of the opposite first and second biasing system positions. The housing may be formed integrally with a meter housing of an associated metering system for metering commodity to or into the valve device housing. The housing may further be formed integrally with a manifold or a manifold housing of a commodity distribution run system of an associated work cart or the like. The housing may further be formed integrally with both the meter housing of the associated metering system and with the manifold or manifold housing of the commodity distribution run system. The housing may further be formed separately from and selectively coupled with the meter housing of the associated metering system and the manifold or manifold housing of the commodity distribution run system. The valve body member includes a valve body member moveable between opposite first and second run selection positions relative to the housing, the valve body member in the first run selection position relative to the housing defining a first fluid circuit comprising the input port opened to the first output port and closed to the second output port, and the valve body member in the second run selection position relative to the housing defining a second fluid circuit comprising the input port closed to the first output port and opened to the second output port. The valve body member moves between the first and second run selection positions relative to the housing.

Other embodiments, features and advantages of the example embodiments for run selector apparatus and run selector biasing systems will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

In the following description reference is made to the accompanying figures which form a part thereof, and in which is shown, by way of illustration, one or more example embodiments of the disclosed valve devices in the form of run selector apparatus and biasing systems for valve devices in the form of run selector apparatus. Various modifications of the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

Figure 1:
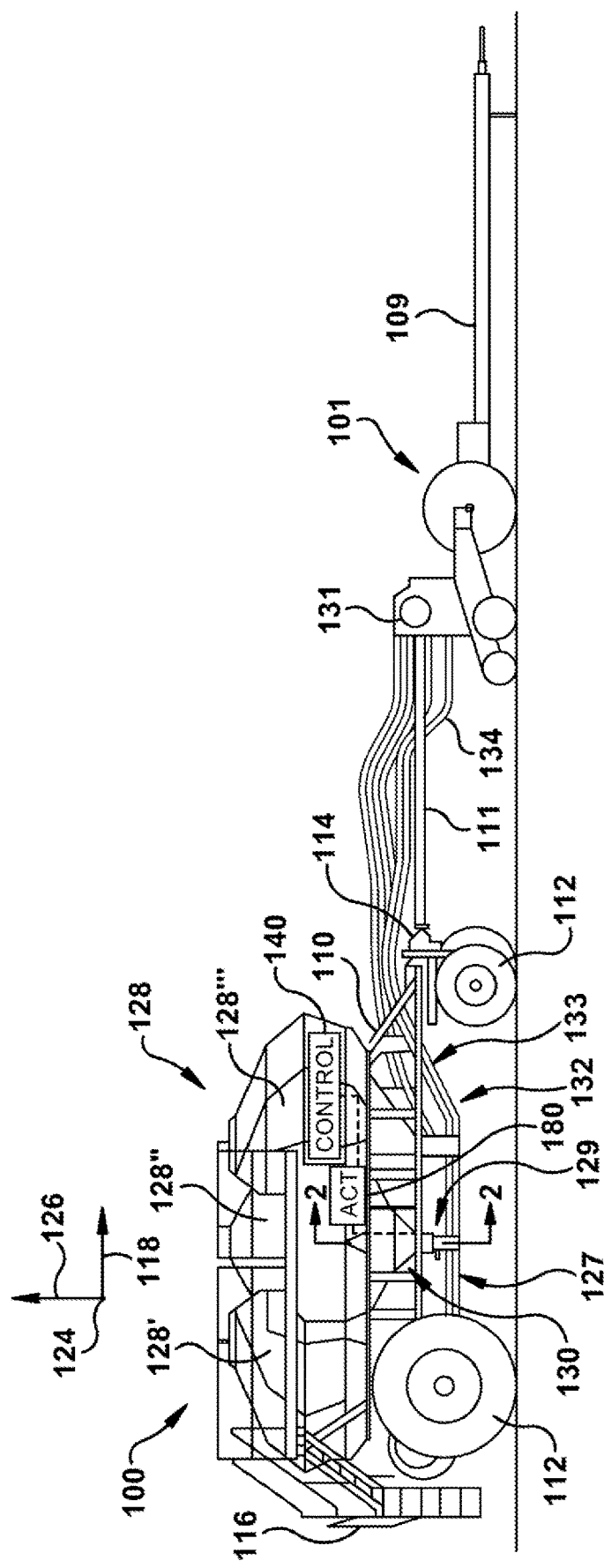
FIG. 1 is a side view of a work vehicle including a run selector apparatus and a run selector biasing system according to example embodiments of the present disclosure.

Referring now to the drawings, wherein the showings are only for the purpose of illustrating the example embodiments only and not for purposes of limiting the same, FIG. 1 illustrates a work vehicle 100 that may be used with the valve devices in the form of run selector apparatus and biasing systems for biasing valve devices in the form of run selector apparatus according to example embodiments of the present disclosure. In the illustrated embodiment, the work vehicle 100 may be towed by another vehicle, such as a tractor (not shown), or it may be a self-propelled vehicle. The work vehicle 100 may be an air cart or air drill that contains a bulk amount of a commodity, that meters out the commodity from the bulk amount, and that moves the metered commodity away from the work vehicle 100 for planting in the ground. In some embodiments, the commodity delivered from the work vehicle 100 may be metered further downstream before being planted.

The work vehicle 100 shown in FIG. 1 is merely an example embodiment of an application of the run selector apparatus and biasing systems of the present disclosure. One or more features of the present disclosure may be included on or in a different work vehicle, such as a planter, a commodity cart, or on or in any other type of vehicle or system without departing from the scope of the present disclosure.

A longitudinal axis 118 (i.e., primary axis) is indicated in FIG. 1 for reference purposes. The longitudinal axis 118 may be substantially parallel to a direction of travel of the work vehicle 100. Thus, the longitudinal axis 118 may be parallel to a fore-aft axis of the work vehicle 100. A lateral axis 124 is also indicated in FIG. 1 into and out from the page as viewed. The lateral axis 124 may be perpendicular to the longitudinal axis 118 and may extend between opposite lateral sides of the work vehicle 100. Furthermore, a vertical axis 126 is indicated in FIG. 1 for reference purposes.

The work vehicle 100 may be configured for delivering the commodity to one or more row units 101. Each row unit 101 may include features for respectively tilling the soil, opening a furrow in the soil, depositing the commodity into the furrow, and closing the furrow. In some embodiments, the row units 101 may be connected together and arranged in series along the lateral axis 124. Thus, although only one row unit 101 is shown in FIG. 1, it will be appreciated that similar row units 101 may be included and disposed in series along the lateral axis 124. The row units 101 may be connected to the work vehicle 100 via a rear tow bar 111. The row units 101 may also be connected to the towing vehicle (e.g., tractor) via a forward tow bar 109. Accordingly, the row units 101 may be disposed between the work vehicle 100 and the towing vehicle with respect to the longitudinal axis 118. However, the row units 101 may be disposed behind the work vehicle 100 in some embodiments and/or the row units 101 may be directly connected to the work vehicle 100 (i.e., directly connected to the frame of the work vehicle 100) without departing from the scope of the present disclosure.

As shown in FIG. 1, the work vehicle 100 may include a frame 110 (i.e., chassis) and a plurality of wheels 112. The frame 110 may be assembled from rigid beams, bars, brackets, or other structures and may support the components described in detail below. The wheels 112 may support the frame 110 on terrain and enable movement of the vehicle 100 across the terrain. As shown, the frame 110 may extend between a front end 114 and a rear end 116 of the work vehicle 100. The tow bar 111 may extend from the frame 110 at the front end 114 for attaching the work vehicle 100 to the row units 101.

The work vehicle 100 may further include one or more commodity containers 128 (tanks, vessels, or other commodity source). The containers 128 may be supported on the frame 110. The commodity containers 128 may contain seed, fertilizer, and/or another particulate or granular commodity. Additionally, in some embodiments, the containers 128 may include a liquid commodity. There may be any number of containers 128. In the illustrated embodiment, for example, there are three commodity containers 128', 128", and 128'". However, other machine configurations may include four or more commodity containers.

Additionally, the work vehicle 100 may include at least one metering system 130. The metering system 130 may be a volumetric metering system. The metering system 130 may be configured to receive commodity from a commodity container 128 and may meter commodity to or into a downstream component. In some embodiments, the metering system 130 may be supported by the frame 110 and may be disposed generally underneath a commodity container(s) 128. The metering system 130 of the work vehicle 100 may include a plurality of metering elements (e.g., metering rollers) that actuate to meter out the commodity from a commodity container 128. During operation, particles of the commodity within one of the containers 128', 128", 128'" may move along the vertical axis 126 downwardly toward the metering system 130. The metering system 130 may operate to meter out the commodity from one of the containers 128', 128", 128'" at a controlled rate such as during times when the vehicle 100 moves across the field.

The work vehicle 100 may also include a delivery system 132. The delivery system 132 may include at least one delivery run 133. The delivery run(s) 133 may define a fluid pathway for delivery of the commodity away from the work vehicle 100. In some embodiments, a plurality of the runs 133 may include a respective one or more run structures 127 (i.e., a primary tube or pipe) that is supported below the metering system 130. The run structures 127 may be rigid pipe segments that are fixed to the frame 110. The run structures 127 may be in fluid communication with downstream components (e.g., downstream pipe segments in the respective delivery run 133, downstream manifolds, and/or the row units 101).

The runs 133 may conduct a flow of air from the rear end 116 to the front end 114 and away from the work vehicle 100. Airflow within the delivery runs 133 may be generated by one or more fan(s) or other source(s) (not shown) mounted on the rear end 116 of the vehicle 100. The one or more fan(s) or other source(s) provide one or more source(s) of flowing fluid(s) at one or more different pressure(s) as may be necessary and/or desired to carry the one or more different commodities to the row units 101.

Additionally, the delivery runs 133 may be operably connected with the metering system 130 such that particles of the commodity metered out by the metering system 130 may be received by selected ones of the delivery runs 133. In some embodiments, the particles may move substantially vertically downward into the selected delivery runs 133. Once in the delivery runs 133, the air stream therein may propel the metered particles away from the work vehicle 100 and toward the row units 101.

In some embodiments, at least one of the delivery runs 133 of the delivery system 132 may be operably connected with a downstream metering system 131. As shown in FIG. 1, the downstream metering system 131 may be supported by the row unit 101. It will be appreciated that a plurality of row units 101 may include respective downstream metering systems 131. Additionally, in some embodiments, some row units 101 may include a respective downstream metering system 131 and others may not. In some embodiments, the downstream metering system 131 may be a singulating metering system that receives the commodity via one of the delivery runs 133 and that meters out singulated particles of the commodity therefrom for planting.

Furthermore, the delivery system 132 may include at least one run selector system 129. The run selector system 129 may be supported by the frame 110 in some embodiments. The run selector system 129 may be operably disposed between the metering system 130 and two or more of the run structures 127. As will be discussed, the run selector system 129 may be configured for selectively changing the pathway for the commodity from a selected container 128 through the delivery runs 133 by movement of a valve body relative to a valve housing of a commodity valve. For example, the run selector system 129 may be used to select a first position of the valve body relative to the run selector valve housing in which commodity metered from the metering system 130 moves from the selected commodity container 128 via the metering system 130 to a first one of the delivery runs 133 for delivery to a respective row unit 101. The run selector system 129 may further be used to select a second position of the valve body relative to the run selector valve housing in which commodity metered from the metering system 130 moves from the selected commodity container 128 via the metering system 130 to a second one of the delivery runs 133 for delivery to a different row unit 101.

In some embodiments, one or more actuators such as for example a set of electric motors, drag link arms, multiple connected levers (not shown), or the like may be included for the run selector system 129 to be moved by operator or other control between the different positions to select between the different pathways for the commodity through the delivery system 132 by moving the valve body relate to the valve housing thereby controlling the flow of the commodity to the selected delivery run.

Figure 2A:
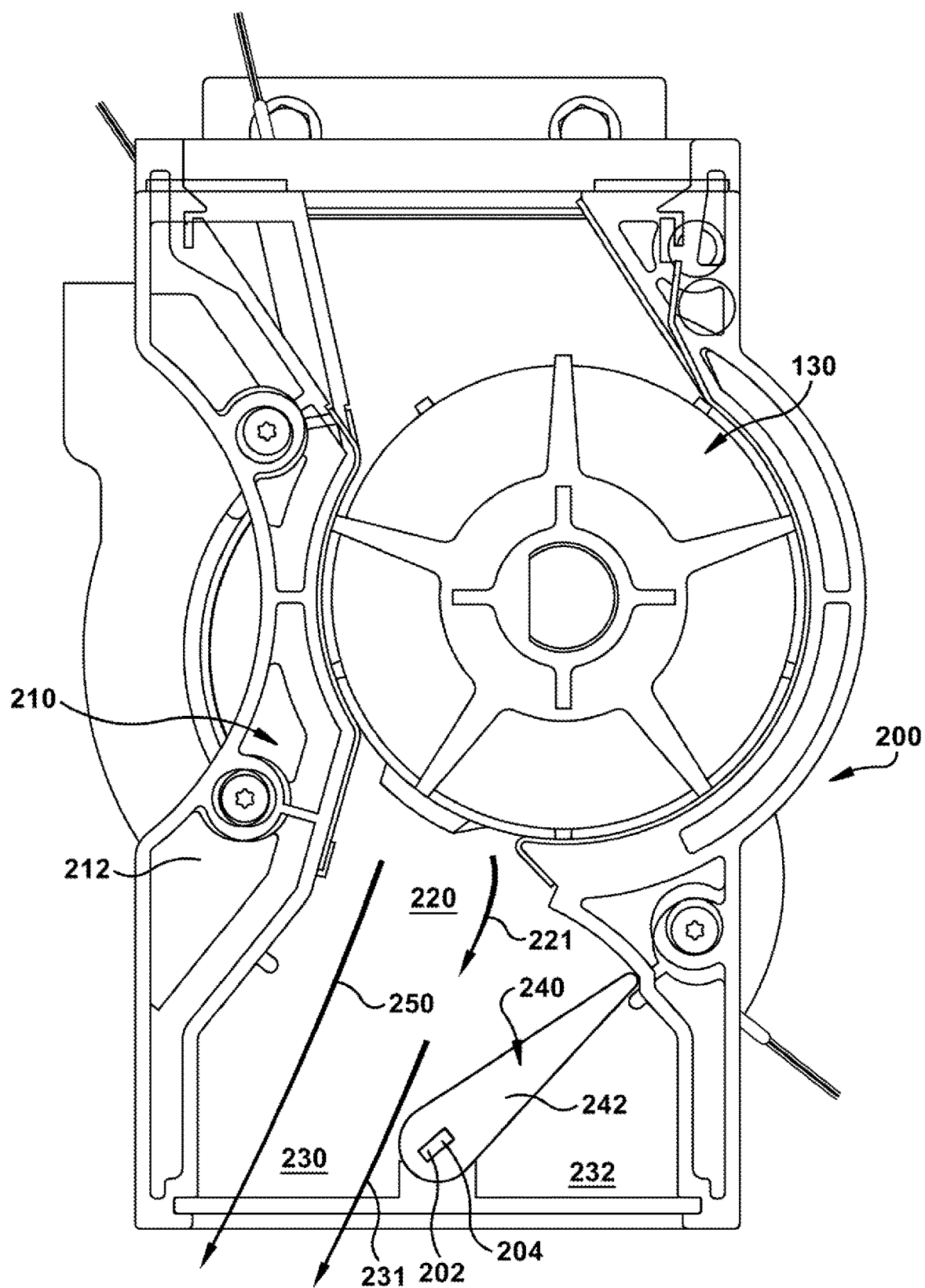
FIGS. 2a and 2b illustrate a run selector apparatus of a run selector system in accordance with an example embodiment.
Figure 2B:
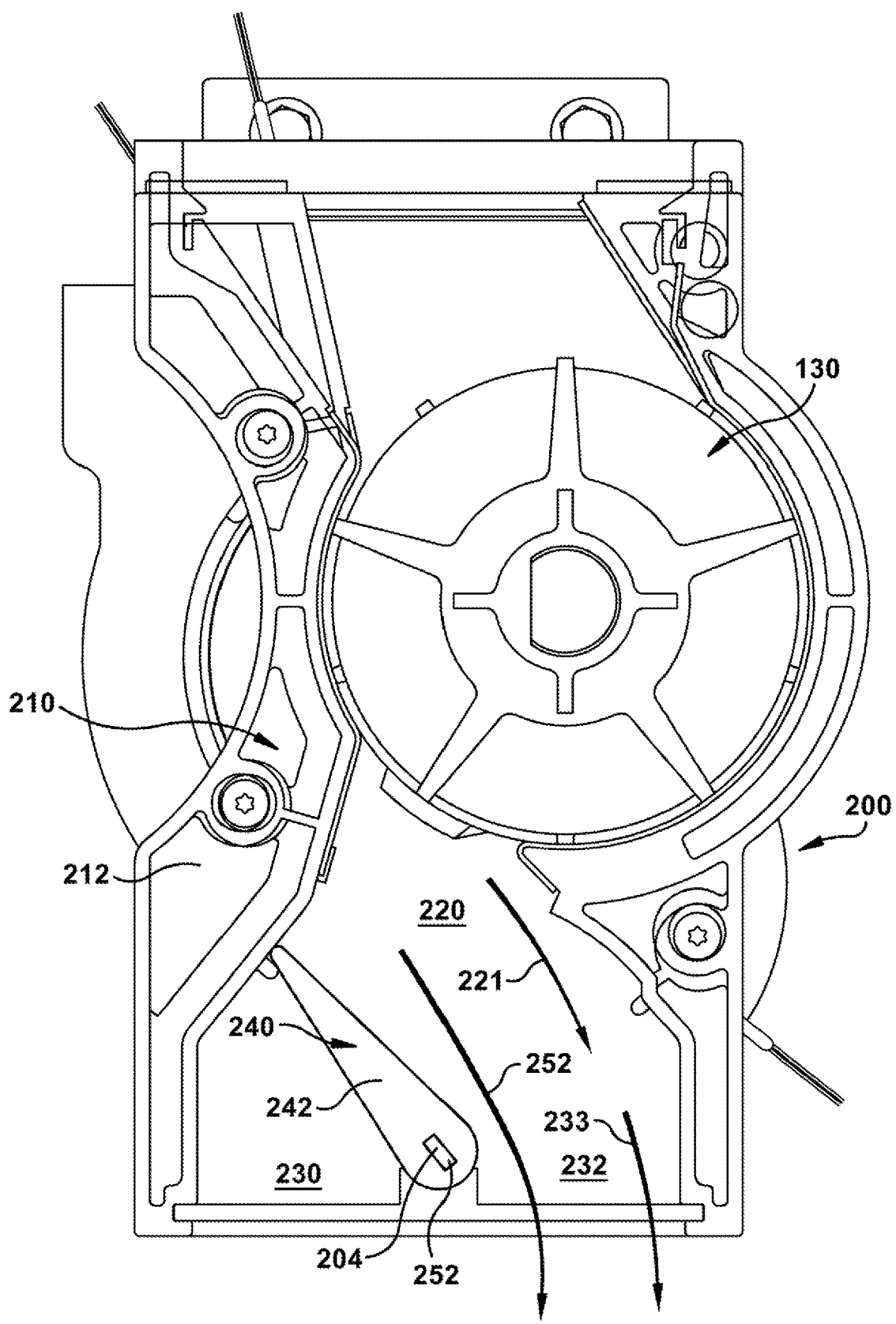

FIGS. 2a and 2b schematically illustrate a run selector apparatus 200 of the run selector system 129 described above provided in accordance with an example embodiment. It is to be appreciated that the run selector system 129 may include a plurality of the run selector apparatus 200 as shown. The run selector apparatus 200 is illustrated in combination with a metering system 130 of the type described in general above wherein, in the example illustrated, the run selector apparatus 200 is provide together with the metering system 130 as an integrated unit. The run selector apparatus 200 is shown in a first operative position in FIG. 2a and in a second operative position in FIG. 2b. The run selector apparatus 200 includes a valve housing 210 having an input port 220 and first and second output ports 230, 232, and a valve member 240 disposed in the valve housing 210. The valve member 240 of the example embodiment includes a valve body member 242 moveable between opposite first (FIG. 2a) and second (FIG. 2b) run selection positions relative to the valve housing 210. The valve body member 242 is in the form of a flapper valve body member in the example embodiment. That is, the valve body member has an overall substantially planar conformation and is shown in the drawing figures on an end view thereof wherein a general plane defined by the valve body member is perpendicular to the page in the illustration. However, it is to be appreciated that the valve body member 242 may take on any equivalent form including for example valve bodies having other shapes and/or configurations and bodies that are rotatable and/or slideable relative to the valve housing 210 for selecting delivery of the commodity to either of the first or second output ports 230, 232.

In the example embodiment the valve member 240 is pivotable about a pivot axis 202 that extends out of the page as viewed in the Figures. The pivotal motion of the valve member 240 may be operated by a control arm member (not shown in FIGS. 2a, 2b), wherein the control arm member may be formed integrally with the valve body member 242 or may be formed separately and then selectively attached with the valve body member 242. In this regard, the valve member 240 of the example embodiment shown in FIGS. 2a and 2b includes a keyed surface conformation 204 (FIGS. 2a, 2b) defined by a portion of the valve member 240 near the pivot axis 202. In the example embodiment, the keyed surface conformation 204 is coextensive with the pivot axis 202 and may be used as an interface for attachment of a suitable control arm member or the like to the valve body member 242.

When the valve member 240 is disposed in the first run selection position relative to the valve housing 210 such as shown in FIG. 2a, the run selector apparatus 200 defines a first fluid circuit 250 that includes the input port 220 opened to the first output port 230 and closed to the second output port 232. When the valve member 240 is disposed in the second run selection position relative to the valve housing 210 such as shown in FIG. 2b, the run selector apparatus 200 defines a second fluid circuit 252 that includes the input port 220 closed to the first output port 230 and opened to the second output port 232.

As described above, the run selector apparatus 200 includes a valve housing 210 containing the valve member 240. In the example embodiment, the valve housing 210 defines a housing body 212 defining an input port 220 downstream of the metering system 130 for conducting an input fluid flow 221 into the housing body via the input port 220, a first output port 230 in selective fluid communication based on the position of the valve member 240 with the input port 220 for conducting the input fluid flow 221 out of the housing body 212 as a first output fluid flow 231, and a second output port 232 in selective fluid communication based on the position of the valve member 240 with the input port 220 for conducting the input fluid flow 221 out of the housing body 212 as a second output fluid flow 233.

In the example embodiment, the input fluid flow 221 and the first output fluid flow 231 generally follow the first fluid circuit 250 for the valve member 240 disposed in the first position shown in FIG. 2a. Similarly in the example embodiment, the input fluid flow 221 and the second output fluid flow 233 generally follow the second fluid circuit 252 for the valve member 240 disposed in the second position shown in FIG. 2b.

Figure 3A:
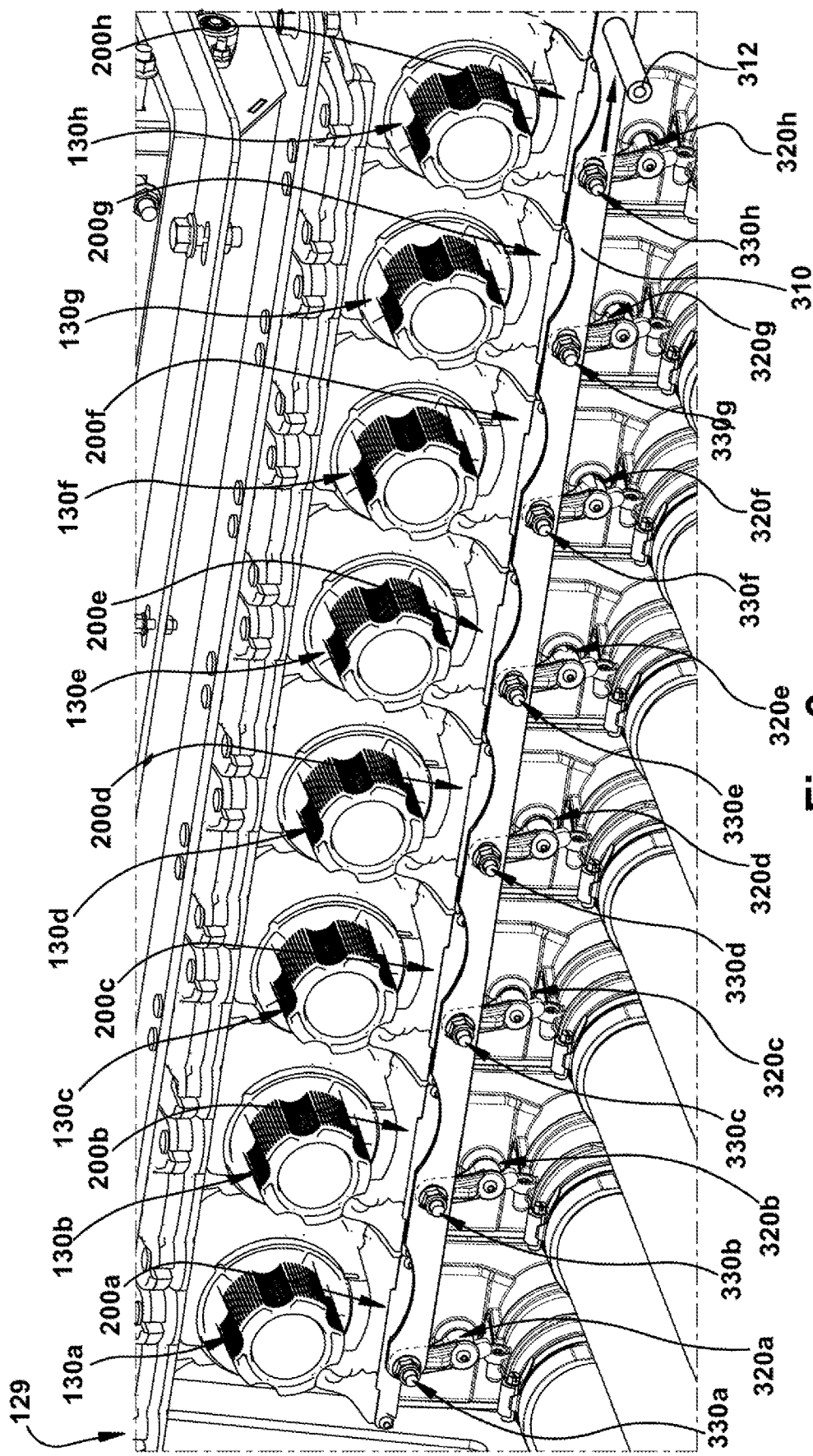
FIGS. 3a and 3b show several of the run selector systems of FIG. 1 arranged in a row in an example application in an associated commodity cart.
Figure 3B:
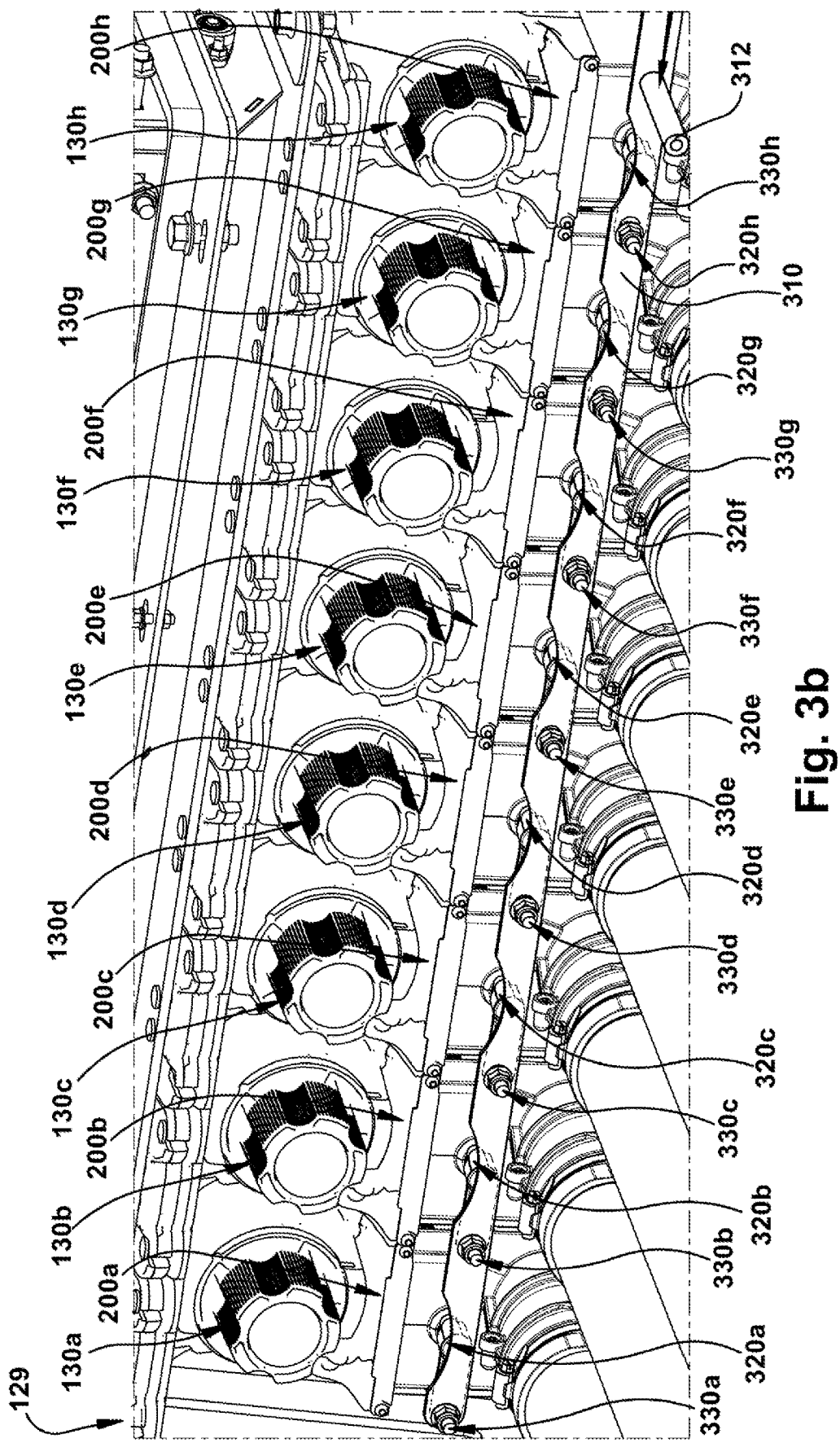

The run selector system 129 of FIG. 1 is shown from a different perspective and in greater detail in FIGS. 3a and 3b. As shown, the run selector system 129 of the example embodiment includes a set of upper metering systems 130a-130h coupled below with a corresponding set of run selector apparatus 200a-200h. Each of the run selector apparatus 200a-200h is formed substantially identically as shown in FIGS. 2a and 2b, for example, and each is arranged on the associated work vehicle 100 in parallel and generally in a line extending along the lateral axis 124 (FIG. 1). Arranged in that manner, the operation of the bank of run selector apparatus 200a-200h to control the flow of commodity product therethrough may be collectively controlled in unison by the position of an elongate drag link 310 operatively coupled with crank arm members 320a-320h that are in turn operatively coupled with the valve members 240 (FIGS. 2a and 2b) of the run selector apparatus.

The drag link 310 may be moved rightwardly (as viewed in the Figure) by an operator or the like pulling on a handle 312 to the position as shown for example in FIG. 3a to simultaneously operate each of the crank arm members 320a-320h clockwise as viewed in the Figure. The crank arm members 320a-320h are pivotable about a corresponding set of pivot axes (not shown) best illustrated in FIGS. 2a and 2b defined by the valve members 240 of the run selector apparatus. In an example embodiment the crank arm members 320a-320h are formed separately from the valve members 240 of the run selector apparatus so that they may be detached or otherwise removed from the valve members 240 for purposes such as for servicing the system or the like and, in a further example embodiment they are formed integrally with the valve members 240 of the run selector apparatus. Free ends of each of the crank arm members 320a-320h are pivotally coupled with the drag link 310 at pivot joints 330a-330h so that movement of the drag link 310 to the right as viewed in FIG. 3a causes the crank arm members 320a-320h to rotate clockwise in turn pivoting the valve members 240 of each of the run selector apparatus 200a-200h to the first position such as shown in FIG. 2a for example thereby configuring each of the run selector apparatus 200a-200h to establish the first fluid circuit 250 (FIG. 2a) that includes the input port 220 (FIGS. 2a and 2b) opened to the first output port 230 (FIGS. 2a and 2b) and closed to the second output port 232 (FIGS. 2a and 2b).

Similarly, movement of the drag link 310 to the left as viewed in FIG. 3b causes the crank arm members 320a-320h to rotate counterclockwise in turn pivoting the valve members 240 of each of the run selector apparatus 200a-200h to the second position such as shown in FIG. 2b for example thereby configuring each of the run selector apparatus 200a-200h to establish the second fluid circuit 252 (FIG. 2b) that includes the input port 220 (FIGS. 2a and 2b) closed to the first output port 230 (FIGS. 2a and 2b) and opened to the second output port 232 (FIGS. 2a and 2b).

In one example embodiment of the run selector system 129, the pivot joints 330a-330h may include precision mechanical pivot joints comprising pins, bolts, bushings, bearings or the like, wherein the precision mechanical pivot joints provide little or minimal backlash. For example, in an example embodiments, the free ends of the crank arm members 320a-320h may carry pin members that extend through bushings provided in the drag link 310 so that the crank arm members 320a-320h of each of the run selector apparatus may be simultaneously moved to substantially identical orientations relative to the run selector apparatus as controlled by this mechanical connection. In this embodiment backlash tolerance for permitting incomplete travel to either of the positions shown in FIGS. 2a and 2b of one or more of the run selector apparatus 200a-200h to accommodate a clog such as debris lodged between the valve body member and the run selector housing, and biasing for urging the others of the one or more of the run selector apparatus 200a-200h that are not clogged to complete the full travel to either of the fully operated positions shown in FIGS. 2a and 2b may be provided by a structure of the valve body member bodies in a manner to be described in greater detail below with reference to FIGS. 11a-11c and 12a-12c. Alternatively the backlash tolerance may be provided in accordance with an example embodiment at the connection between the crank arm members 320a-320h and the valve body members in a manner also to be described in greater detail below with reference to FIGS. 5a-5e.

In a further embodiment of the run selector system 129, the pivot areas 330a-330h may include compensating pivot joint systems 400 as shown in FIGS. 4a-4d for permitting incomplete travel to either of the positions shown in FIGS. 2a and 2b of one or more of the run selector apparatus 200a-200h. In that way, the example embodiment provides commodity run selector device bank control linkage systems and methods having a predetermined amount of backlash that is formed or otherwise "built-in" between a common drag link coupling the commodity run selector device bank and each of the valve bodies of the run selector devices within the bank so that an obstruction in one or more of the run selector devices of the bank does not adversely affect the full travel or movement of any of the other valve bodies of the other run selector devices without the obstruction. The built-in backlash may be provided in the drag link member, in a portion of a control arms coupled with the valve body members, or both or elsewhere as needed or desired.

The example embodiment biases valve bodies of run selector devices into one or the other opposite position relative to a valve housing of the run selector device to help to seal run selector devices that might otherwise be compromised due to an obstruction of commodity or the like being lodged between an operational edge of the valve body and an inner wall of the valve housing. In that way, each of the individual run selector devices would be able to move independently of the other run selector devices to the desired position in systems using bank control linkage systems and methods having a predetermined amount of backlash.

Figure 4A:
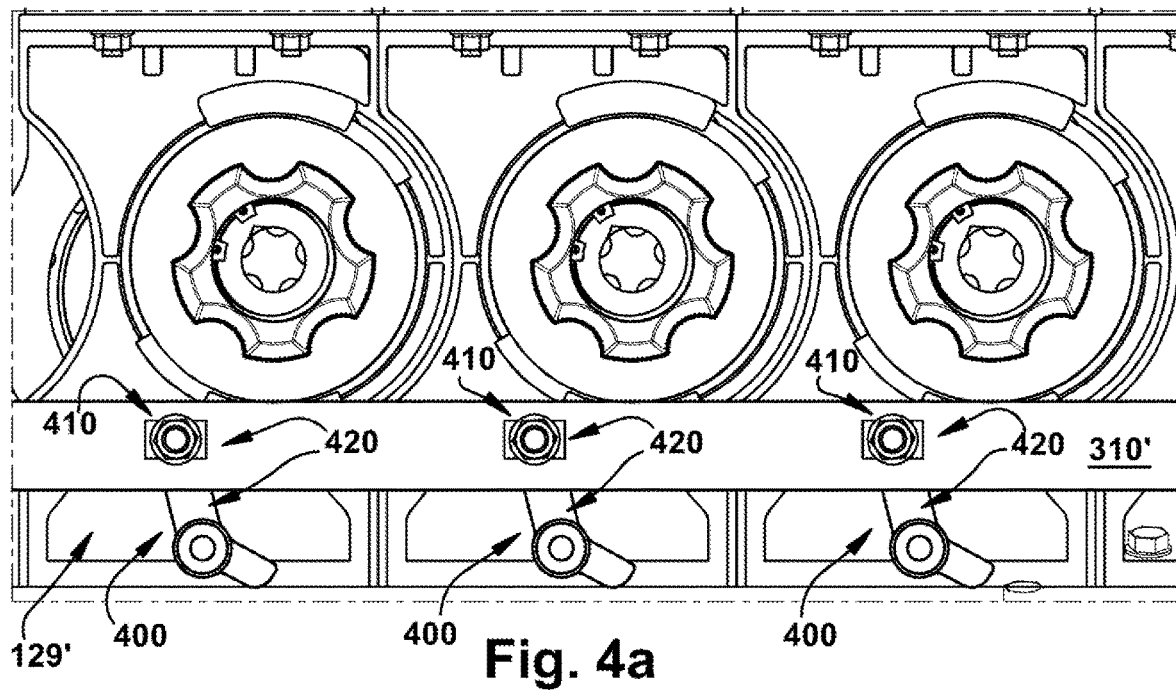
FIGS. 4a and 4b show a run selector system including a compensating pivot joint system in accordance with a further example embodiment.
Figure 4B:
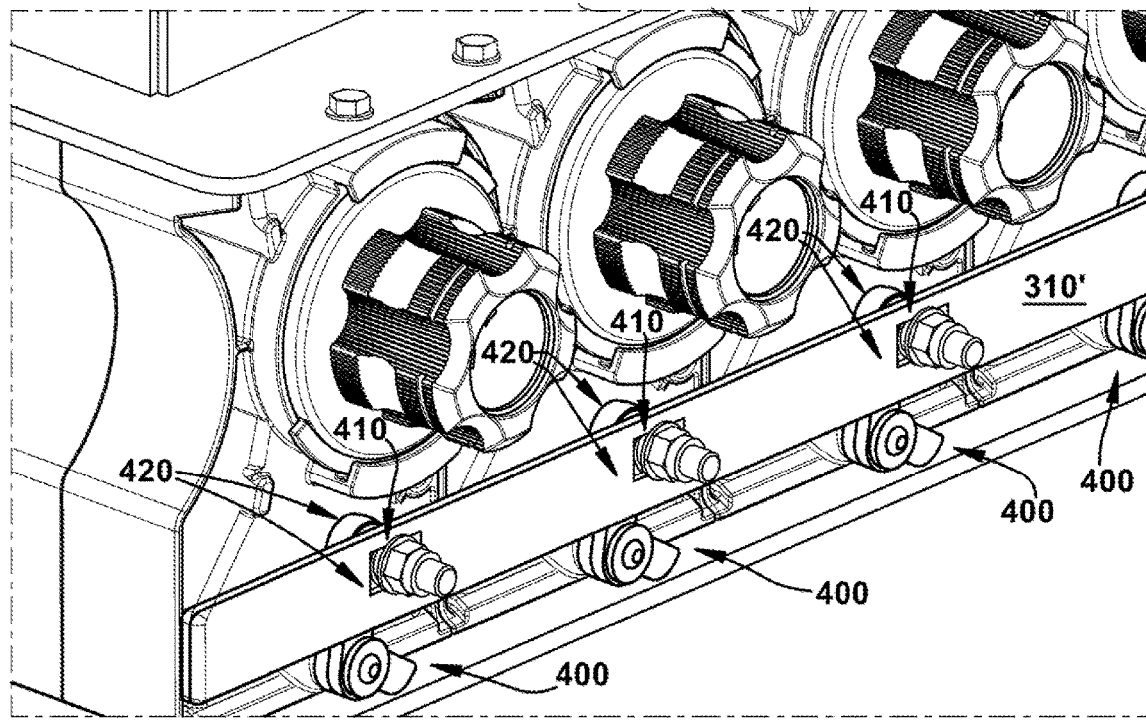
Figure 4C:
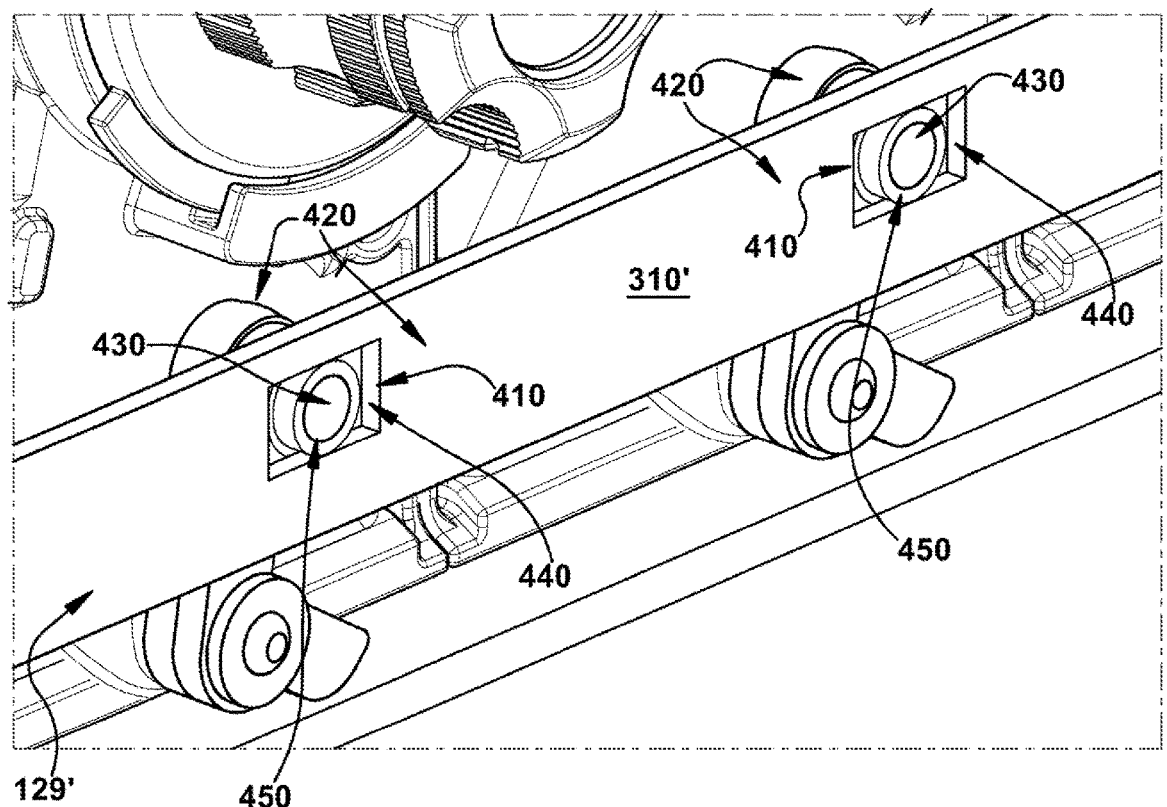
FIG. 4c shows the selector system including the compensating pivot joint system of FIGS. 4a and 4b in partial cross section.
Figure 4D:
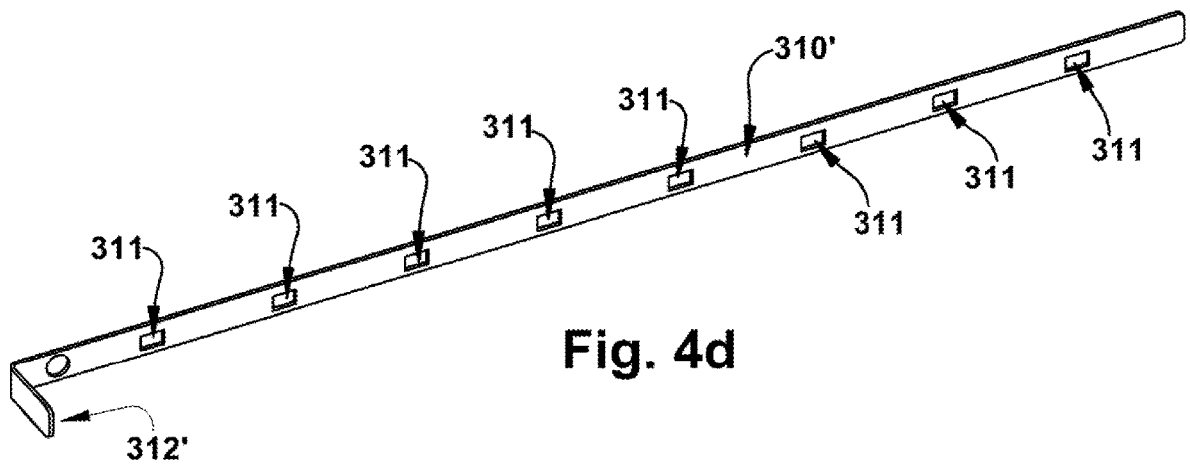
FIG. 4d shows a drag link component of the selector system including the compensating pivot joint system of FIGS. 4a-4c.
Figure 5A:
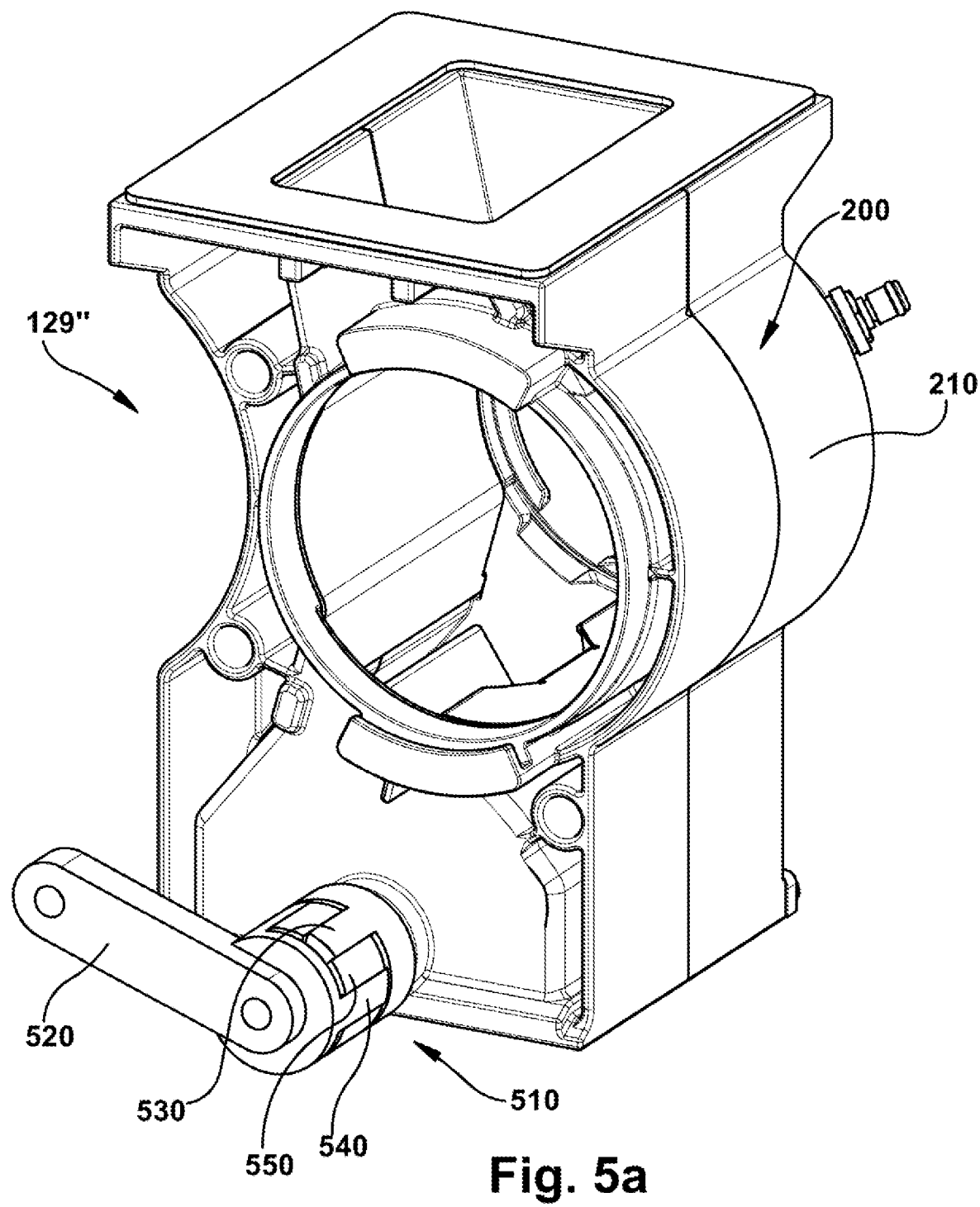
FIGS. 5a and 5b show a run selector system in accordance with a further embodiment.
Figure 5B:
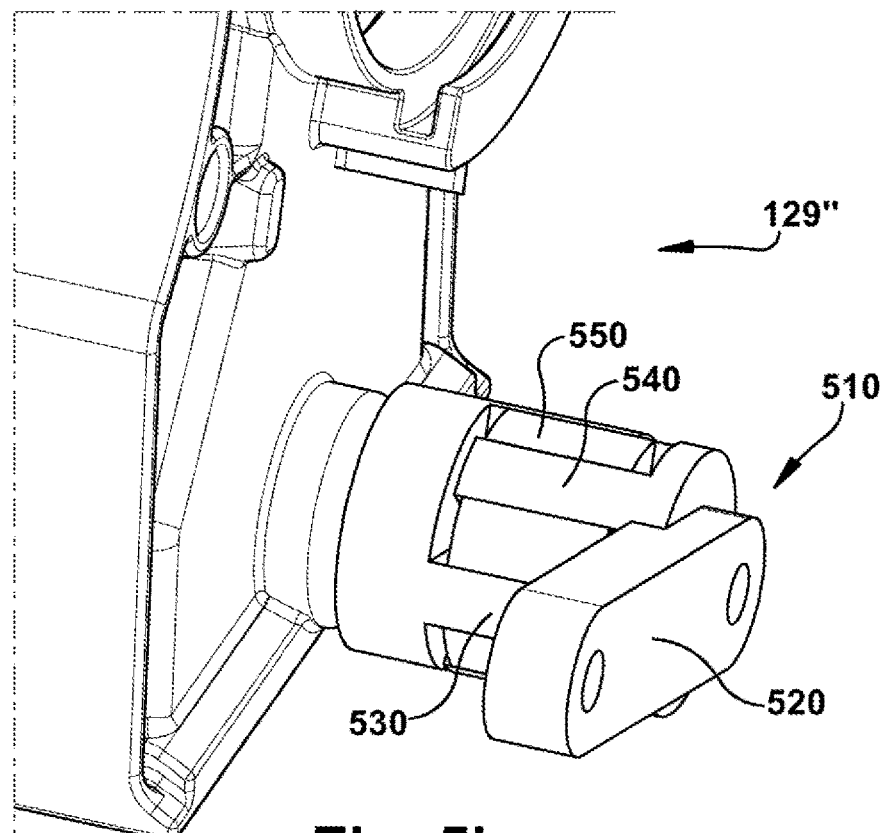
Figure 5C:
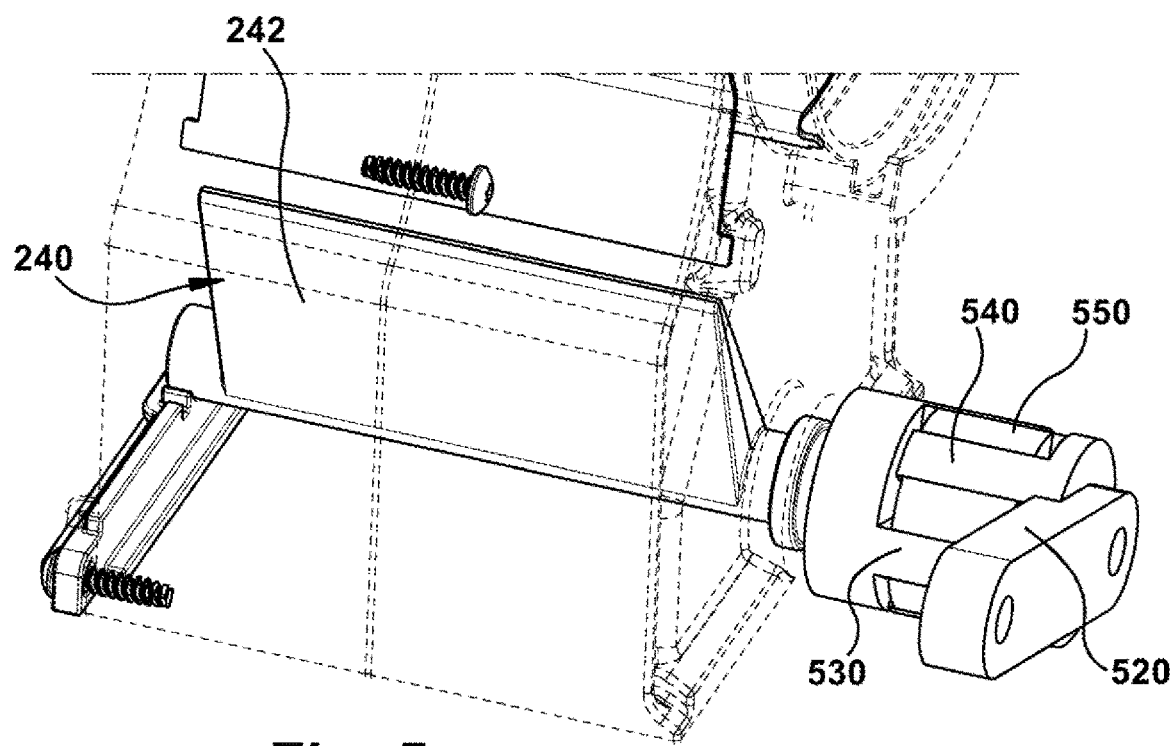
FIG. 5c shows the run selector system of FIGS. 5a and 5b in partial cross section.
Figure 5D:
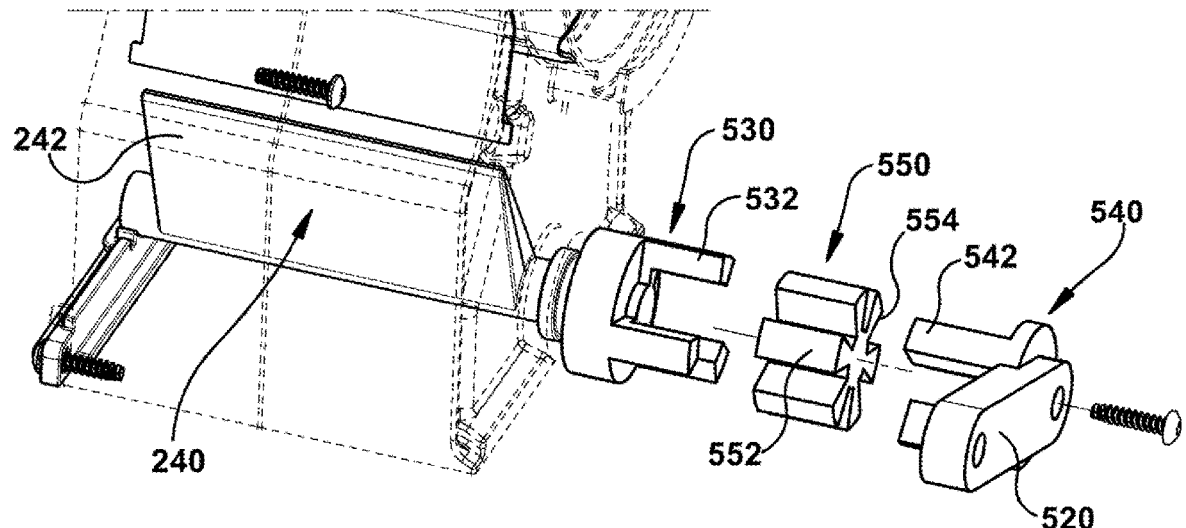
FIG. 5d shows an exploded view of the run selector system of FIG. 5c.
Figure 5E:
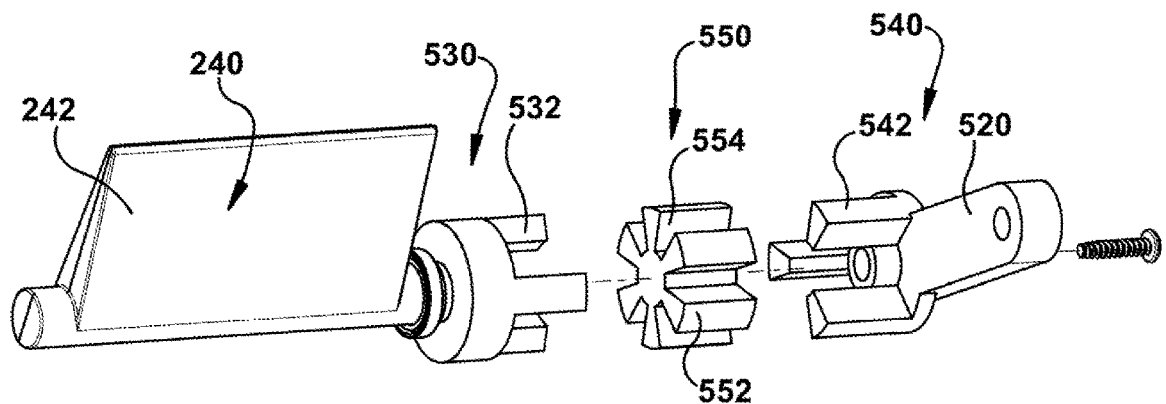
FIG. 5e shows an exploded view of selected components of the run selector system of FIG. 5d.

The joint system 400 accommodates clogs such as debris lodged between the valve body member and the run selector housing, while also biasing for urging the others of the run selector apparatus 200a-200h that are not clogged with debris to complete the full travel to either of the fully operated positions shown in FIGS. 2a and 2b. In this regard, FIGS. 4a and 4b show a run selector system 129' including a compensating pivot joint system 400 in accordance with a further example embodiment. FIG. 4c shows the compensating system 400 of FIGS. 4a and 4b with selected connecting hardware removed for ease of explanation, and FIG. 4d shows a drag link component 310' of the selector system including the compensating pivot joint system 400 of FIGS. 4a-4c.

In an example embodiment of the run selector system 129', rather than the pivot joints 330a-330h including precision mechanical pivot joints as described above comprising pins, bolts, bushings, bearings or the like, wherein the precision mechanical pivot joints provide little or minimal backlash, the run selector system 129' of the embodiment illustrated in FIGS. 4a-4d has a predetermined amount of backlash provided or otherwise "built-in" between a common drag link 310' coupling the commodity run selector device bank and each of the valve bodies of the run selector devices within the bank so that an obstruction in one or more of the run selector devices does not adversely affect the full travel or movement of any of the other valve bodies of the other run selector devices without the obstruction.

A run selector system 129' including a compensating pivot joint system 400 representative of a compensating pivot joint of the pivot areas is shown and described with reference to FIGS. 4a-4d. The compensating pivot joint system 400 in accordance with the example embodiment of the run selector system 129' includes an interface device 410 for enabling selective controlled movement between the valve body of the run selector apparatus and a control arm 420 operatively coupled with the valve body, wherein, the control arm 420 in the example embodiment comprises portions of the drag link 310' in combination with levers of the run selector apparatus 200 of the type described above.

With reference to FIGS. 4a-4d and with additional reference again to FIGS. 2a and 2b, a run selector system 129' in accordance with the further embodiment includes a run selector apparatus 200 of the type described above including a valve housing 210 having an input port 220 (FIGS. 2a, 2b) and first and second output ports 230, 232 (FIGS. 2a, 2b), and a valve member 240 (FIGS. 2a, 2b) disposed in the valve housing 210, and further including an interface device 410, and a control arm member 420 operatively coupled with the valve member 240 by the interface device 410 for moving the valve member 240 between first (FIG. 2a) and second (FIG. 2b) run selection positions relative to the housing. The control arm member 420 may comprise, for example, a modified version 310' of the drag link 310 (FIGS. 2a, 2b) including slotted openings 311 (FIG. 4d) adapted to accommodate the interface device 410 of the example embodiment for permitting incomplete travel to either of the positions shown in FIGS. 2a and 2b of one or more of the run selector apparatus 200a-200h to accommodate a clog such as debris lodged between the valve body member and the run selector housing, while also biasing for urging the others of the run selector apparatus 200a-200h that are not clogged with debris to complete the full travel to either of the fully operated positions shown in FIGS. 2a and 2b.

As described with reference to FIGS. 2a and 2b, the valve member 240 comprises a valve body member 242 moveable between opposite first and second run selection positions relative to the housing. The valve body member disposed in the first run selection position relative to the housing 210 defines a first fluid circuit 250 comprising the input port 220 opened to the first output port 230 and closed to the second output port 232, and the valve body member 242 disposed in the second run selection position relative to the housing 210 defines a second fluid circuit 252 comprising the input port 220 closed to the first output port 230 and opened to the second output port 232.

In the example embodiment, the control arm member 420 in the form of a modified drag link 310 of the type described above is movable between opposite first (FIG. 3a) and second (FIG. 3b) control arm positions corresponding respectively to the first and second run selection positions of the valve member 240. In the example embodiment, the interface device 410 includes a first interface element 430 on the valve member 240, a second interface element 440 on the control arm member 420, and a resilient member 450 disposed between the first and second interface elements 430, 440. In the example embodiment, the resilient member 450 defines an opening configured to receive the first interface element 430 on the valve member 240 to permit limited free movement of the interface element 430 relative to the slotted openings 311 of control arm member 420 portions of the drag link 310'. In the example embodiment, the resilient member 450 is preferably made of a material that is compressible between the first and second interface elements 430, 440 to permit limited relative limited biased movement between the control arm member 420 and the valve member 240 for other portions of travel between the interface element 430 on the valve member 240 and the control arm member 420. The compressibility of the resilient member permits one or more of the run selector apparatus 200a-200h to accommodate a clog such as debris lodged between the valve body member and the run selector housing, while biasing others of the run selector apparatus 200a-200h that are not clogged with debris to one or the other of the fully operated positions. In this embodiment, the reduced travel of the valve body of the commodity valve that is clogged is absorbed by a compression of the resilient member 450 of the compensating pivot joint system 400. In this embodiment, the reduced travel of the valve body of the commodity valve that is clogged is further absorbed by the predetermined amount of backlash provided or otherwise "built-in" by the slotted openings 311 between the common drag link 310' coupling the commodity run selector device bank and each of the valve bodies of the run selector devices.

In a particular example embodiment of the run selector apparatus 129', the control arm member 420 comprises the drag link member 310' operatively coupled with an associated run selection system including for example the handle 312' and/or other mechanisms or means for actuating the drag link member 310'. Also in the particular example embodiment, the resilient member 450 is disposed between the first and second interface elements 430, 440 and is compressible between the first and second interface elements 430, 440 to permit limited relative movement between the elongate crank portion of the valve body member and the drag link member even at the end of travel within the slotted openings 311 of the drag link member 310'.

With reference to FIG. 5 and with additional reference again to FIGS. 2a and 2b, a run selector system 129" in accordance with a further embodiment includes a run selector apparatus 200 of the type described above including a valve housing 210 having an input port 220 (FIGS. 2a, 2b) and first and second output ports 230, 232 (FIGS. 2a, 2b), and a valve member 240 (FIGS. 2a, 2b) disposed in the valve housing 210, and further including an interface device 510, and a control arm member 520 operatively coupled with the valve member 240 by the interface device 510 for moving the valve member 240 between first (FIG. 2a) and second (FIG. 2b) run selection positions relative to the housing.

As described with reference to FIGS. 2a and 2b, the valve member 240 comprises a valve body member 242 moveable between opposite first and second run selection positions relative to the housing. The valve body member disposed in the first run selection position relative to the housing defines a first fluid circuit 250 (FIG. 2a) comprising the input port 220 opened to the first output port 230 and closed to the second output port 232, and the valve body member disposed in the second run selection position relative to the housing defines a second fluid circuit 252 (FIG. 2b) comprising the input port 220 closed to the first output port 230 and opened to the second output port 232.

In the example embodiment, the control arm member 520 is movable between opposite first (FIG. 3a) and second (FIG. 3b) control arm positions corresponding respectively to the first and second run selection positions of the valve member 240. In the example embodiment, the interface device 510 includes a first interface element 530 on the valve member 240, a second interface element 540 on the control arm member 520, and a resilient member 550 disposed between the first and second interface elements 530, 540. In the example embodiment, the resilient member 550 defines a star shaped member having a plurality of radially extending arm members 552 defining a plurality of radially extending slots 554 between the plurality of radially extending arm members 552. Each of the first and second interface elements 530, 540 define a plurality of circumferentially spaced apart axially extending bosses 532, 542 configured to extend into the plurality of radially extending slots 554. A width of each of the spaced apart axially extending bossed 532, 542 in a circumferential direction is in the example embodiment less than a width of the plurality of radially extending slots 554 in the circumferential direction to permit limited free movement of the interface element 530 relative to the control arm member 520. In the assembled disposition of the run selector system 129" in accordance with the example embodiment, the axially extending bossed 532, 542 are interdigitatedly received in the plurality of radially extending slots 554. In addition, the resilient member 550 is preferably made of a material that is compressible between the first and second interface elements 530, 540 to permit limited relative limited biased movement between the control arm member 520 and the valve member 240 for other portions of travel between the interface element 530 on the valve member 240 and the control arm member 520. The compressibility of the resilient member permits one or more of the run selector apparatus 200a-200h to accommodate a clog such as debris lodged between the valve body member and the run selector housing, while biasing others of the run selector apparatus 200a-200h that are not clogged with debris to one or the other of the fully operated positions.

Figure 6A:
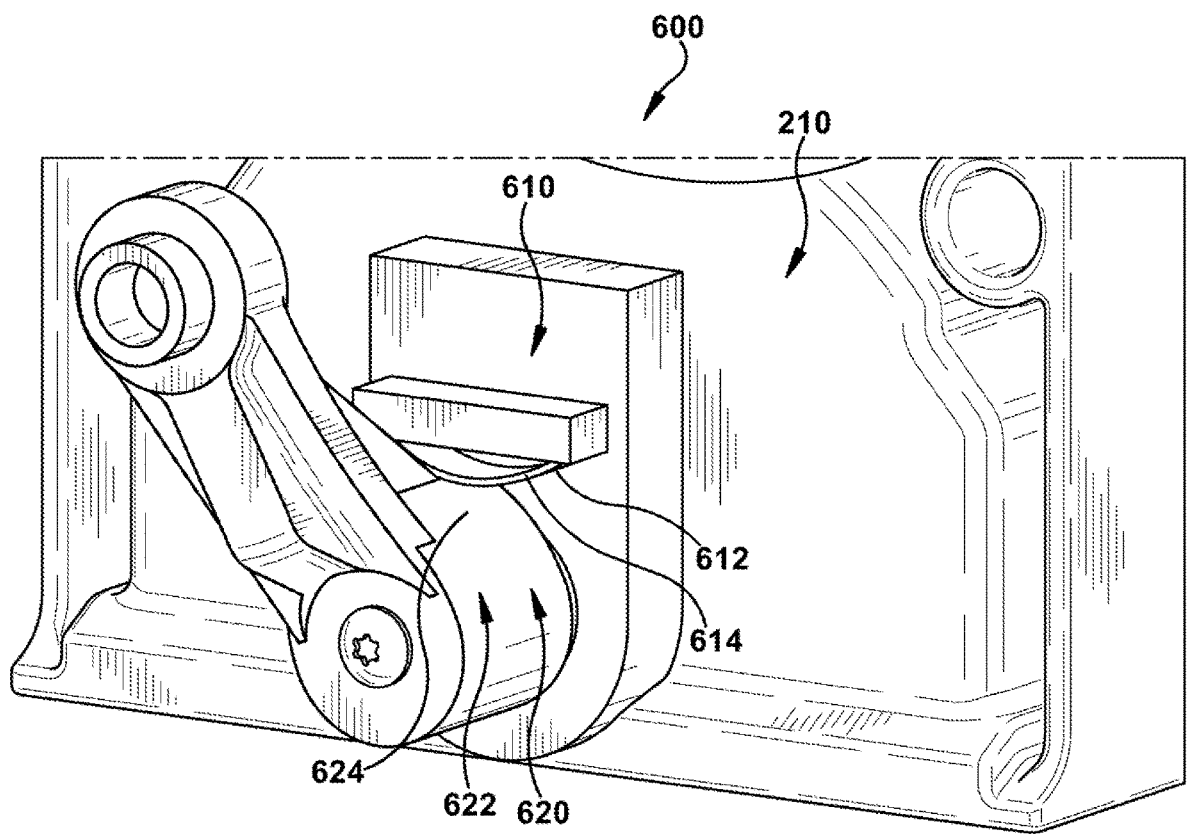
FIG. 6a illustrates a biasing system for use with an associated run selector device in accordance with an example embodiment.
Figure 6B:
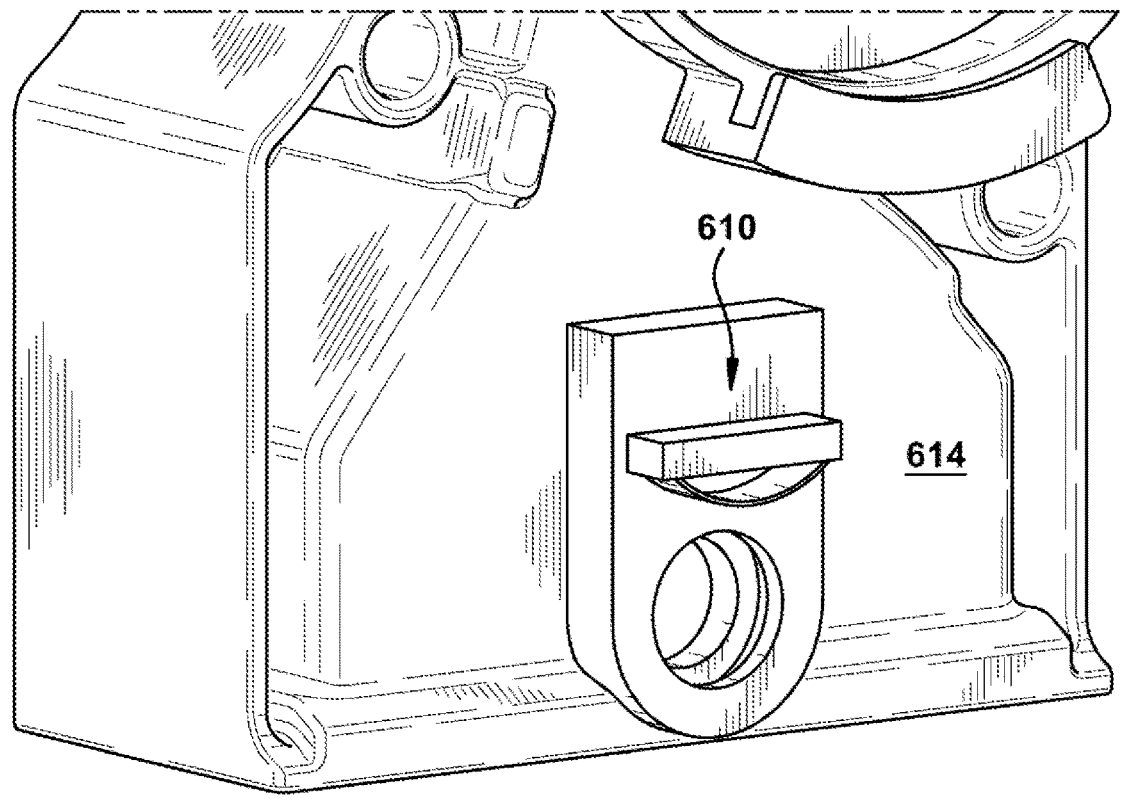
FIGS. 6b and 6c illustrate biasing components of the biasing system of FIG. 6a in accordance with an example embodiment.
Figure 6C:
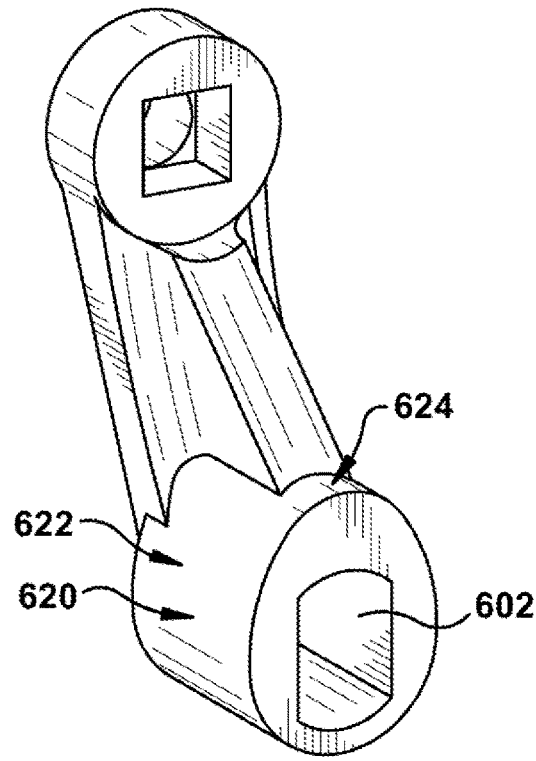

FIGS. 6a-6c illustrate a biasing system 600 for use with an associated run selector device 200 of the type shown in FIGS. 2a and 2b having a valve member 240 movable within a valve housing 210 between opposite first (FIG. 2a) and second (FIG. 2b) run selection positions selecting respective first and second commodity distribution runs of the associated run selector device. The biasing system 600 of the example embodiment includes a first biasing element 610 on or otherwise coupled with the valve housing 210 of the associated run selector device 200, and a second biasing element 620 on or otherwise coupled with the valve member 240 of the associated run selector device 200. The second biasing element 620 may be carried on the valve member 240 such as by mutual engagement between a keyway 602 defined on one end of the first biasing element and the corresponding keyed surface conformation 204 (FIGS. 2a, 2b) defined by the valve member 240. As shown, the first and second biasing elements 610, 620 are movable relative to each other between opposite first and second biasing system positions together with the associated valve member 240 being moved relative to the housing 210 between the opposite first and second run selection positions by the mutual engagement between the keyed surface conformation 204 and the keyway 602. The first and second biasing elements 610, 620 are mutually biased against each other to urge each other apart and towards a one or the other of the opposite first and second biasing system positions.

In a particular example embodiment, the first biasing element 610 is a bendable resilient member 612 on or otherwise coupled with the valve housing 210 of the associated run selector device 200, and the second biasing element is an engagement surface 622 defined on or by the second biasing element 620. In the example embodiment the bendable resilient member 612 and the engagement surface 622 are mutually biased against each other to urge each other towards a one or the other of the opposite first and second biasing system positions thereby urging the valve member 240 of the associated run selector device to a corresponding one or the other of the opposite first and second run selection positions.

In addition to the above, in the particular example embodiment, the first biasing element 610 is a bendable resilient member 612 in the form of a spring member 614 coupled with the valve housing 210 of the associated run selector device, and the second biasing element 620 is a cam element 624 on or otherwise coupled with the valve member 240 of the associated run selector device. In the embodiment, the spring member 614 and the cam element 624 are mutually biased against each other to urge each other towards a one or the other of the opposite first and second biasing system positions thereby urging the valve body member 240 of the associated run selector device to a corresponding one or the other of the opposite first and second run selection positions. In a further example embodiment, the cam element 624 may be provided as a separate part rotatably coupled with a shaft of the valve member located on the valve member on the opposite side from the selector arm.

In accordance with selected example embodiments herein, therefore, a biasing method is provided for use with an associated run selector device having a valve member movable within a housing between opposite first and second run selection positions selecting respective first and second commodity distribution runs of the associated run selector device. The biasing method may comprise providing a first biasing element on the housing of the associated run selector device, providing a second biasing element on the valve member of the associated run selector device, and mutually biasing the first and second biasing elements against each other to urge each other apart, wherein the first and second biasing elements are movable relative to each other between opposite first and second biasing system positions together with the associated valve member being moved relative to the housing between the opposite first and second run selection positions, and wherein the first and second biasing elements mutually biased against each other urge each other apart and towards a one or the other of the opposite first and second biasing system positions. The providing a first one of the first and second biasing elements may comprise providing a bendable resilient member, and the providing the other one of the first and second biasing elements may comprise providing an engagement surface, wherein the bendable resilient member and the engagement surface are mutually biased against each other to urge each other towards a one or the other of the opposite first and second biasing system positions thereby urging the associated valve member towards a corresponding one or the other of the opposite first and second run selection positions.

Figure 7A:
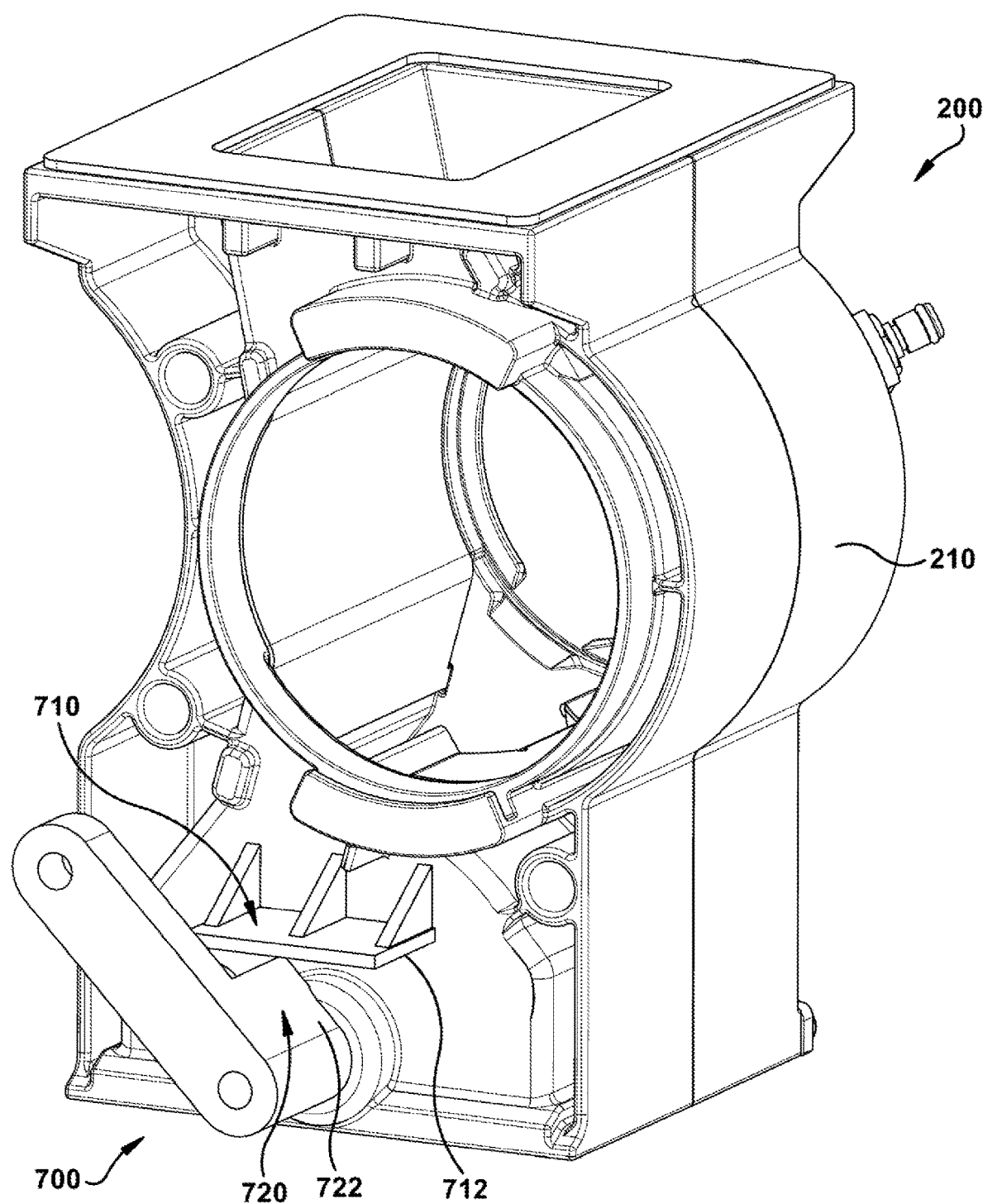
FIG. 7a illustrates a biasing system and components thereof for use with an associated run selector device in accordance with an example embodiment.
Figure 7B:
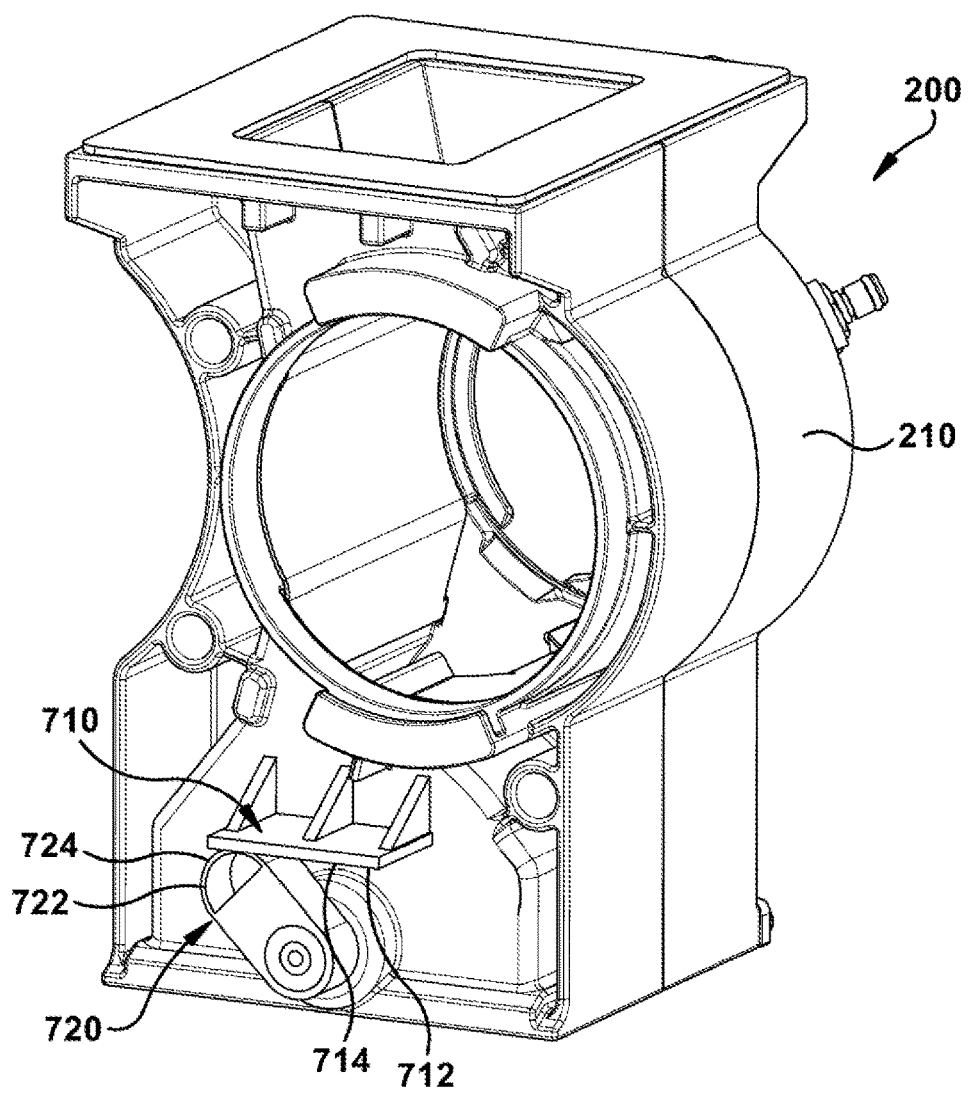
FIGS. 7b and 7c illustrate biasing components of the biasing system of FIG. 7a in accordance with an example embodiment.
Figure 7C:
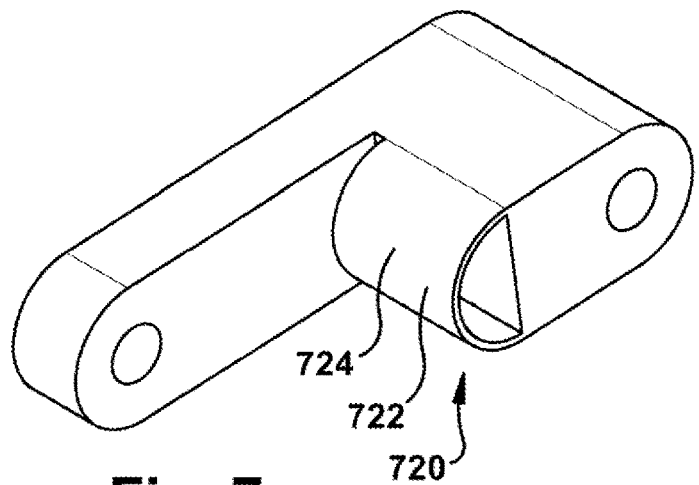

FIGS. 7a-7c illustrate a further biasing system 700 and components therefor for use with an associated run selector device 200 of the type shown in FIGS. 2a and 2b having a valve member 240 movable within a valve housing 210 between opposite first (FIG. 2a) and second (FIG. 2b) run selection positions selecting respective first and second commodity distribution runs of the associated run selector device. The biasing system 700 of the example embodiment includes a first biasing element 710 on or otherwise coupled with the valve housing 210 of the associated run selector device 200, and a second biasing element 720 on or otherwise coupled with the valve member 240 of the associated run selector device 200. The second biasing element 720 may be carried on the valve member 240 such as by mutual engagement between a keyway 602 (FIG. 6c) defined on one end of the first biasing element 710 and the corresponding keyed surface conformation 204 (FIGS. 2a, 2b) defined by the valve member 240. As shown, the first and second biasing elements 710, 720 are movable relative to each other between opposite first and second biasing system positions together with the associated valve member 240 being moved relative to the housing 210 between the opposite first and second run selection positions by the mutual engagement between the keyed surface conformation 204 and the keyway 602 (FIG. 6c). The first and second biasing elements 710, 720 are mutually biased against each other to urge each other apart and towards a one or the other of the opposite first and second biasing system positions.

In a particular example embodiment, the first biasing element 710 is an engagement surface 712 defined on or by the or otherwise coupled with the valve housing 210 of the associated run selector device 200, and the second biasing element 720 is a bendable resilient member 722 such as for example a spring. In the example embodiment the bendable resilient member 722 and the engagement surface 712 are mutually biased against each other to urge each other towards a one or the other of the opposite first and second biasing system positions thereby urging the valve member 240 of the associated run selector device to a corresponding one or the other of the opposite first and second run selection positions.

In addition to the above, in the particular example embodiment, the first biasing element 710 is a raceway 714 coupled with the valve housing 210 of the associated run selector device, and the second biasing element 720 is a spring member 724 on or otherwise coupled with the valve member 240 of the associated run selector device. In the embodiment, the spring member 724 and the raceway 714 are mutually biased against each other to urge each other towards a one or the other of the opposite first and second biasing system positions thereby urging the valve body member of the associated run selector device to a corresponding one or the other of the opposite first and second run selection positions.

Figure 8:
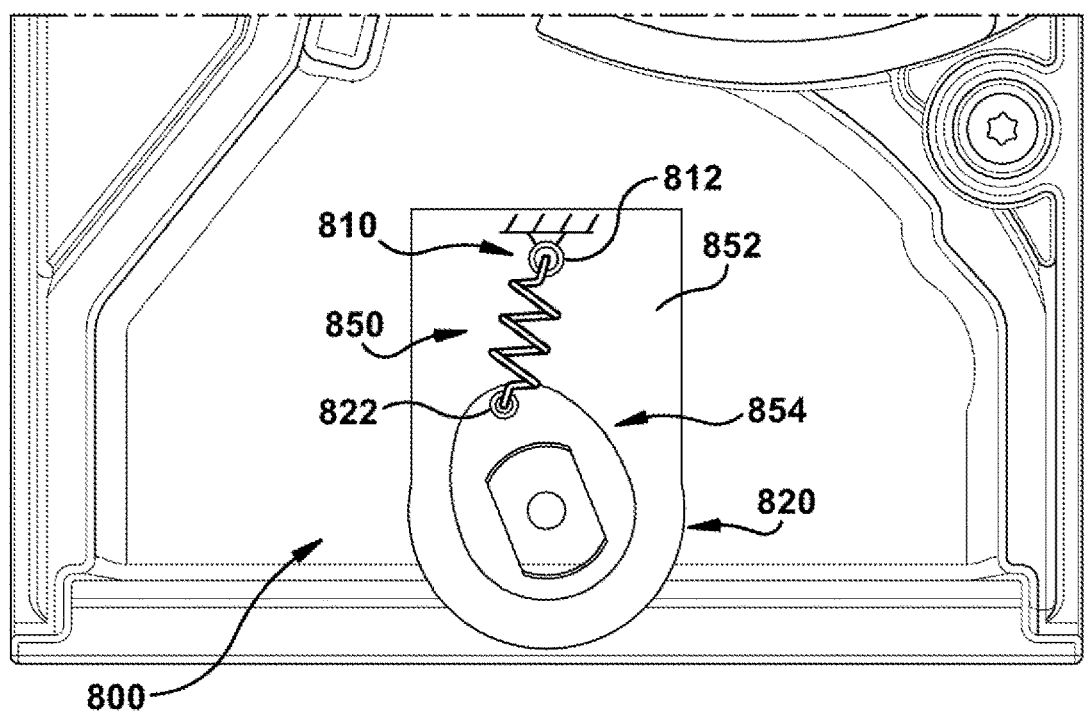
FIG. 8 illustrates a biasing system for use with an associated run selector device in accordance with an example embodiment.

FIG. 8 illustrates a further biasing system 800 for use with an associated run selector device 200 of the type shown in FIGS. 2a and 2b having a valve member 240 movable within a valve housing 210 between opposite first (FIG. 2a) and second (FIG. 2b) run selection positions selecting respective first and second commodity distribution runs of the associated run selector device. The biasing system 800 of the example embodiment includes a first biasing element 810 on or otherwise coupled with the valve housing 210 of the associated run selector device 200, and a second biasing element 820 on or otherwise coupled with the valve member 240 of the associated run selector device 200. The second biasing element 820 may be carried on the valve member 240 such as by mutual engagement between a keyway 602 (FIG. 6c) defined on one end of the first biasing element and the corresponding keyed surface conformation 204 (FIGS. 2a, 2b) defined by the valve member 240. As shown, the first and second biasing elements 810, 820 are movable relative to each other between opposite first and second biasing system positions together with the associated valve member 240 being moved relative to the valve housing 210 between the opposite first and second run selection positions by the mutual engagement between the keyed surface conformation 204 and the keyway 602. The first and second biasing elements 810, 820 are mutually biased against each other to urge each other apart and towards a one or the other of the opposite first and second biasing system positions.

It is to be appreciated in the example embodiment that one or both of the first and second biasing elements 810, 820 may comprise a compression spring assembly 850 disposed in compression between the first and second biasing elements 810, 820. In the example embodiment illustrated, however, the first biasing element 810 comprises a first fastening member 812 on the valve housing 210 of the associated run selector device 200, wherein the first fastening member 812 is pivotally connected with a first end 852 of the compression spring assembly 850. Also in the embodiment illustrated, the second biasing element 820 comprises a second fastening member 822 on the valve member 240 of the associated run selector device 200, wherein the second fastening member 822 is pivotally connected with a second end 854 of the compression spring assembly 850. It is to be appreciated that the compression spring assembly 850 of the biasing system 800 of the example embodiment biases the first and second biasing elements 810, 820 mutually against each other to urge the first and second biasing elements 810, 820 towards a one or the other of the opposite first and second biasing system positions thereby urging the valve body member of the associated run selector device to a corresponding one or the other of the opposite first and second run selection positions.

Figure 9:
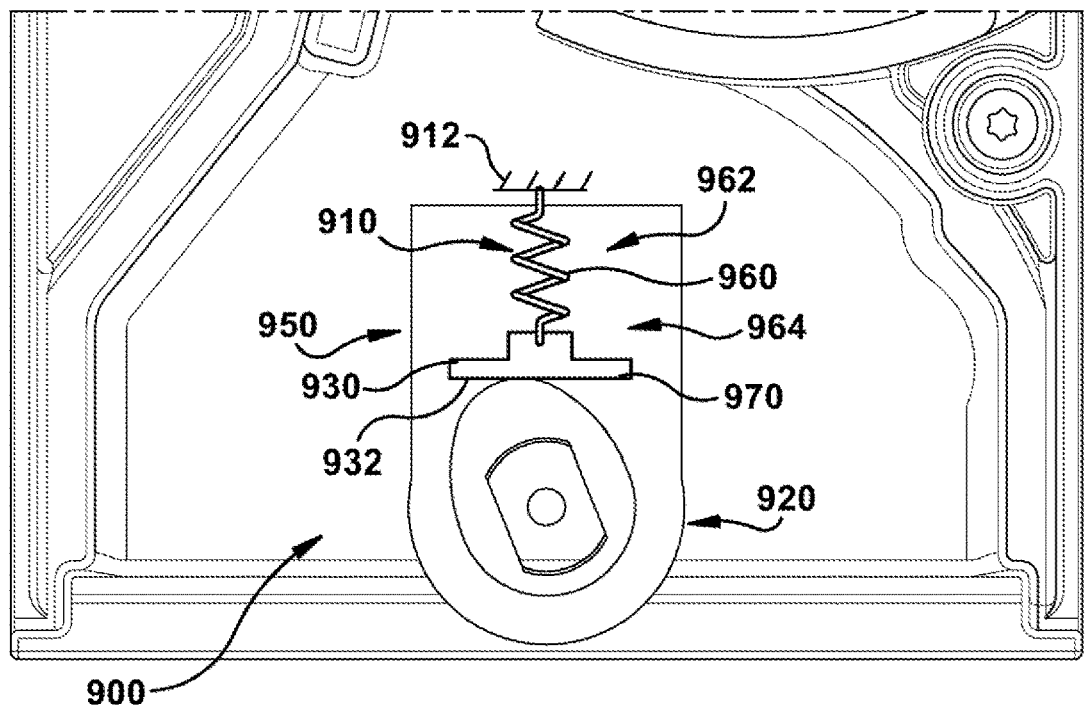
FIG. 9 illustrates a biasing system for use with an associated run selector device in accordance with an example embodiment.

FIG. 9 illustrates a further biasing system 900 for use with an associated run selector device 200 of the type shown in FIGS. 2a and 2b having a valve member 240 movable within a valve housing 210 between opposite first (FIG. 2a) and second (FIG. 2b) run selection positions selecting respective first and second commodity distribution runs of the associated run selector device. The biasing system 900 of the example embodiment includes a first biasing element 910 on or otherwise coupled with the valve housing 210 of the associated run selector device 200, and a second biasing element 920 on or otherwise coupled with the valve member 240 of the associated run selector device 200. The second biasing element 920 may be carried on the valve member 240 such as by mutual engagement between a keyway 602 (FIG. 6c) defined on one end of the first biasing element and the corresponding keyed surface conformation 204 (FIGS. 2a, 2b) defined by the valve member 240. As shown, the first and second biasing elements 910, 920 are movable relative to each other between opposite first and second biasing system positions together with the associated valve member 240 being moved relative to the housing between the opposite first and second run selection positions by the mutual engagement between the keyed surface conformation 204 and the keyway 602. The first and second biasing elements 910, 920 are mutually biased against each other to urge each other apart and towards a one or the other of the opposite first and second biasing system positions.

In the example embodiment of the further biasing system 900 illustrated in FIG. 9, a first one of the first and second biasing elements 910, 920 comprises a compression spring assembly 950 disposed in compression between the first and second biasing elements 910, 920. The compression spring assembly 950 of the example embodiment comprises a compression spring member 960 having opposite first 962 and second 964 ends, and a raceway block 970 operatively coupled with the second end 964 of the compression spring member 960. The first one of the first and second biasing elements 910, 920 comprises a fastening member 912 operatively coupling the first end 962 of the compression spring member 960 with the valve housing 210 of the associated run selector device 200. The other one of the first and second biasing elements 910, 920 comprises a cam member 930 having a cam surface 932 configured to engage the raceway block 970 of the compression spring assembly 950.

In the example embodiment of the further biasing system 900 illustrated in FIG. 9, engagement between the raceway block 970 of the compression spring assembly 950 and the cam surface 932 of the cam member biases the first and second biasing elements 910, 920 mutually against each other to urge the first and second biasing elements towards a one or the other of the opposite first and second biasing system positions thereby urging the valve body member of the associated run selector device to a corresponding one or the other of the opposite first and second run selection positions.

Figure 10A:
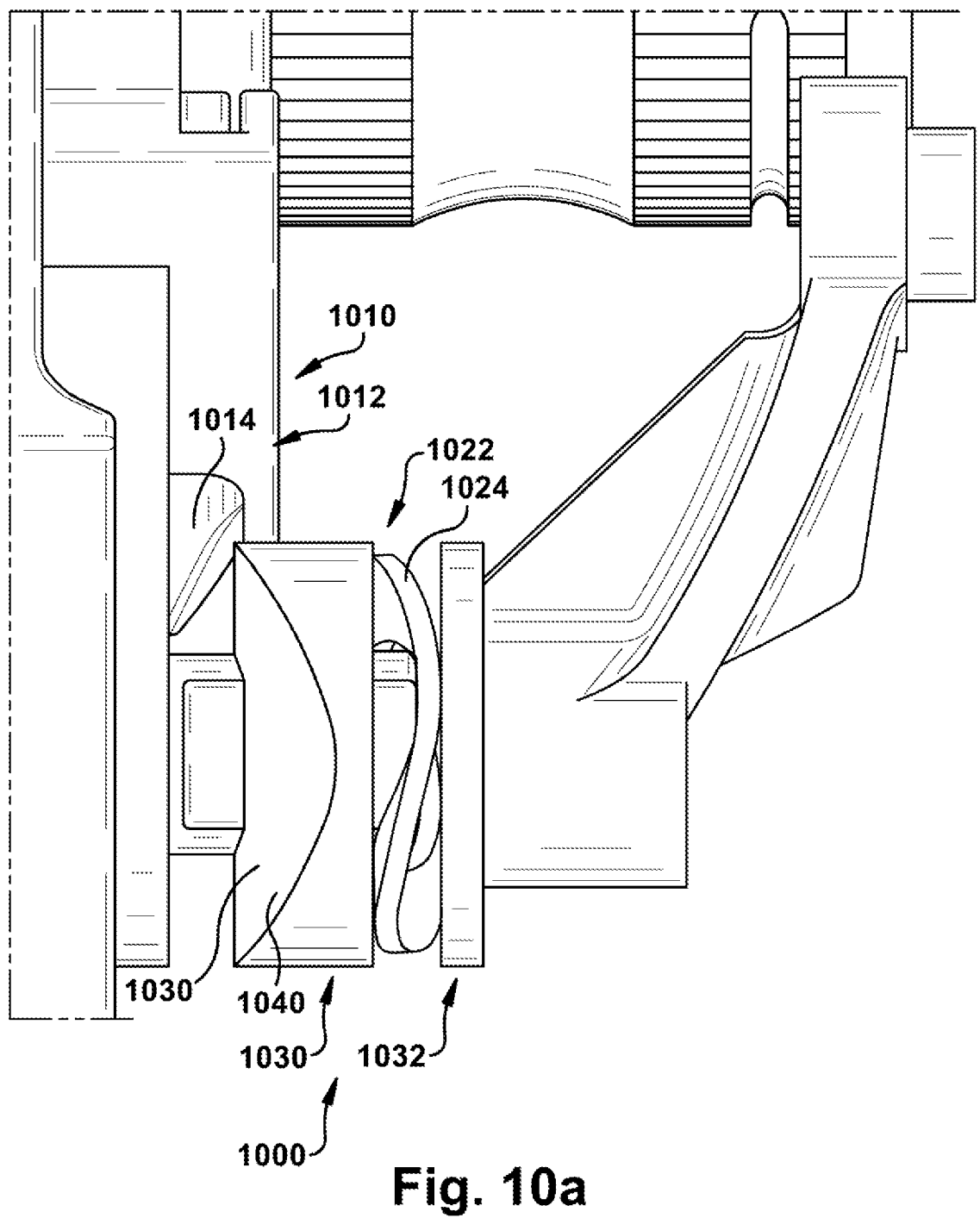
FIGS. 10a and 10b illustrate a biasing system for use with an associated run selector device in accordance with an example embodiment.
Figure 10B:
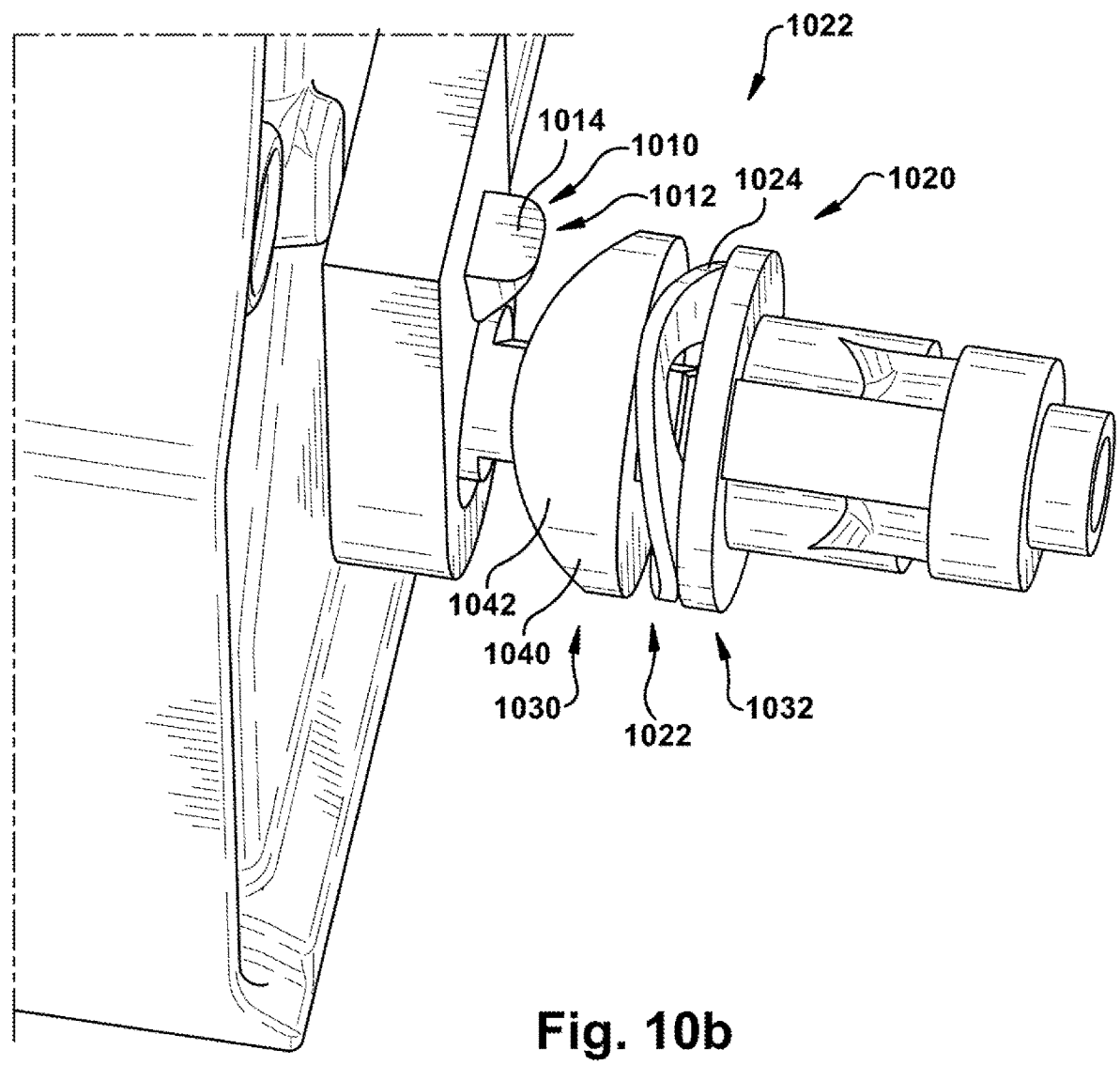
Figure 11A:
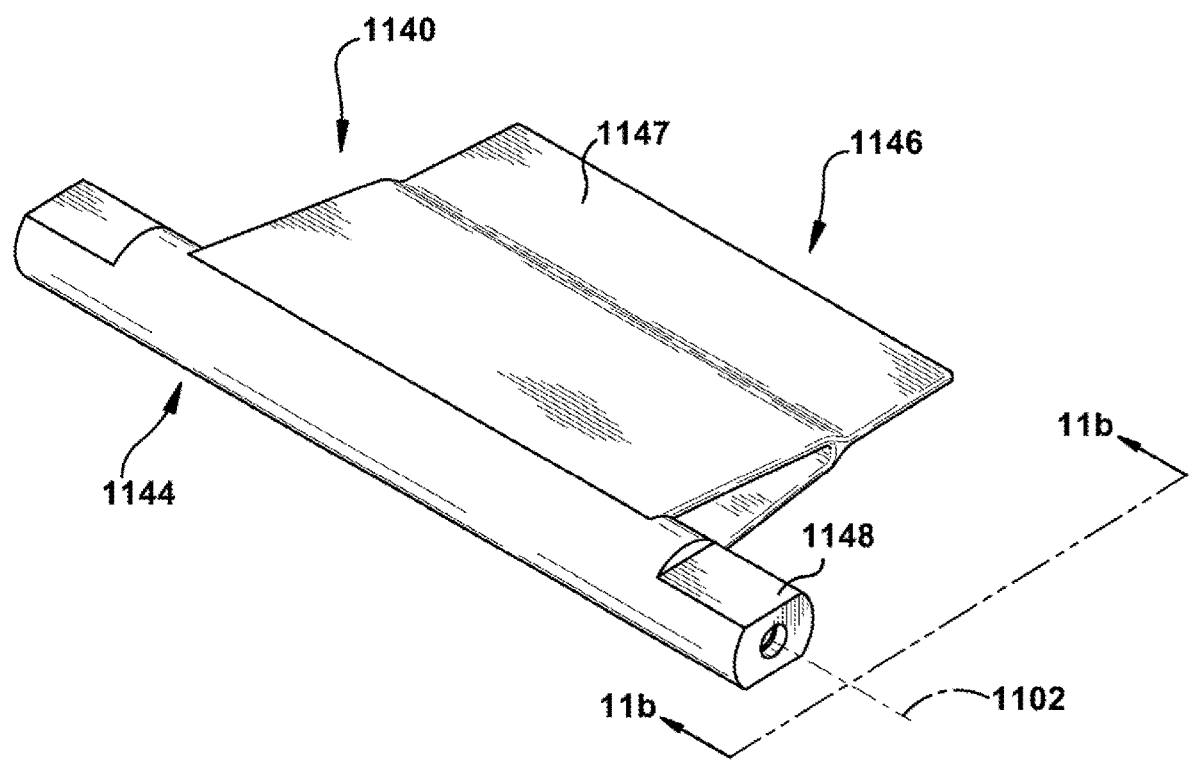
FIG. 11a illustrates a flexible valve body member for use with an associated self-compensating run selector device in accordance with an example embodiment.
Figure 11B:
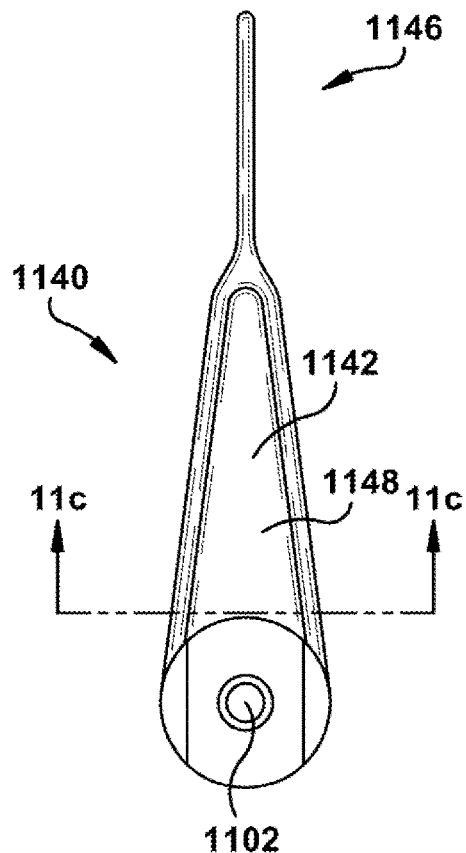
FIG. 11b illustrates an end view of the flexible valve body member of FIG. 11a taken along line 11b-11b in FIG. 11a in accordance with an example embodiment.
Figure 11C:
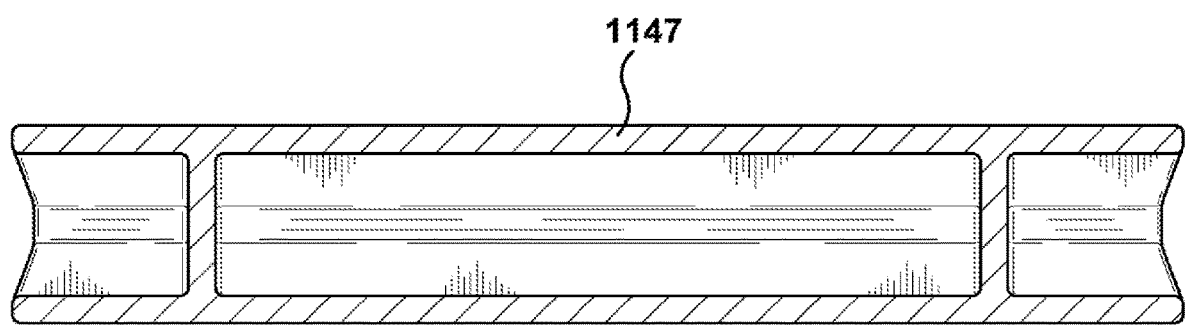
FIG. 11c illustrates a cross-sectional view of the flexible valve body member of FIGS. 11a and 11b taken along line 11c-11c in FIG. 11b in accordance with an example embodiment.

FIGS. 10a and 10b illustrate a biasing system 1000 for use with an associated run selector device 200 of the type shown in FIGS. 2a and 2b having a valve member 240 movable within a valve housing 210 between opposite first (FIG. 2a) and second (FIG. 2b) run selection positions selecting respective first and second commodity distribution runs of the associated run selector device. The biasing system 1000 of the example embodiment includes a first biasing element 1010 on or otherwise coupled with the valve housing 210 of the associated run selector device 200, and a second biasing element 1020 on or otherwise coupled with the valve member 240 of the associated run selector device 200. The second biasing element 1020 may be carried on the valve member 240 such as by mutual engagement between a keyway 602 (FIG. 6c) defined on one end of the first biasing element and the corresponding keyed surface conformation 204 (FIGS. 2a, 2b) defined by the valve member 240. As shown, the first and second biasing elements 1010, 1020 are movable relative to each other between opposite first and second biasing system positions together with the associated valve member 240 being moved relative to the housing 210 between the opposite first and second run selection positions by the mutual engagement between the keyed surface conformation 204 and the keyway 602. The first and second biasing elements 1010, 1020 are mutually biased against each other to urge each other apart and towards a one or the other of the opposite first and second biasing system positions.

In the example embodiment shown in FIGS. 10a and 10b, the first biasing element 1010 comprises a first contoured surface 1012 defined on the housing of the associated run selector device, wherein the first contoured surface 1012 defines a first pattern 1014 on the housing of the associated run selector device. In addition, second biasing element 1020 comprises a spring system 1022 rotatably carried with the valve body member 240 of the associated run selector device for movement relative to the housing 210 of the associated run selector device, wherein the spring system 1022 comprises a wave spring 1024 disposed in compression between opposite first and second end members 1030, 1032. The first end member 1030 of the spring system 1022 defines a second contoured surface 1040 having a second pattern 1042, the first and second contoured surfaces 1012, 1040 being configured to engage each other, and the first and second patterns 1014, 1042 are substantially opposite to each other.

In the example embodiment, the first and second contoured surfaces 1012, 1040 are biased against each other by the wave spring 1024 disposed in compression to urge the first and second biasing members towards a one or the other of the opposite first and second biasing system positions thereby urging the valve body member of the associated run selector device to a corresponding one or the other of the opposite first and second run selection positions.

With reference next to FIGS. 11a-11c and 12a-12c together with FIGS. 2a and 2b, in accordance with an embodiment, a run selector apparatus 200 is self-compensating for obstructions that may lodge between the valve body member and the housing that would prevent the valve body member from completing the full travel to either of the positions shown in FIGS. 2a and 2b. In accordance with an example embodiment, a run selector apparatus self-compensated for obstructions includes a valve member 1140 disposed in the valve housing 210 that defines a valve body member 1142 having a proximal end 1144 pivotable about a pivot axis 1102 between opposite first (FIGS. 2a and 12b) and second (FIGS. 2b and 12c) positions for porting the input fluid flow 221 to the first and second output ports 230, 232, respectively, of the housing body 212, and a distal end 1146 sealing the valve body 1140 against opposite first and second surfaces 213, 214 of the housing body 212 for the valve body member 1142 being disposed in the opposite first and second positions, respectively. In the example embodiment the distal end 1146 of the valve member 1140 comprises a flexible portion 1147 extending along the edge on the distal end 1146 of the valve body member 1142. The flexible portion 1147 may extend around an inner support portion 1148 of the valve member 1140.

In accordance with an example embodiment, the inner support portion 1148 of the valve member 1140 is formed of a first material having a first flexibility characteristic and the flexible portion 1147 of the valve body is formed of a second material having a second flexibility characteristic that is more flexible than the first flexibility characteristic.

In accordance with a particular example embodiment, inner support portion 1148 of the valve member 1140 is formed of a plastic having a durometer of about 70-100 Shore D, and the flexible portion 1147 of the valve member 1140 is formed of a plastic having a durometer of about 40-60 Shore D.

In accordance with further a particular example embodiment, the valve body of the valve is formed of a first material having a first average thickness of about 2-11 mm. in a direction transverse to the pivot axis, and the flexible portion of the valve body is formed of the first material having a second average thickness of about 1-2 mm. in the direction transverse to the pivot axis that is less than the first average thickness of the valve body.

Figure 12A:
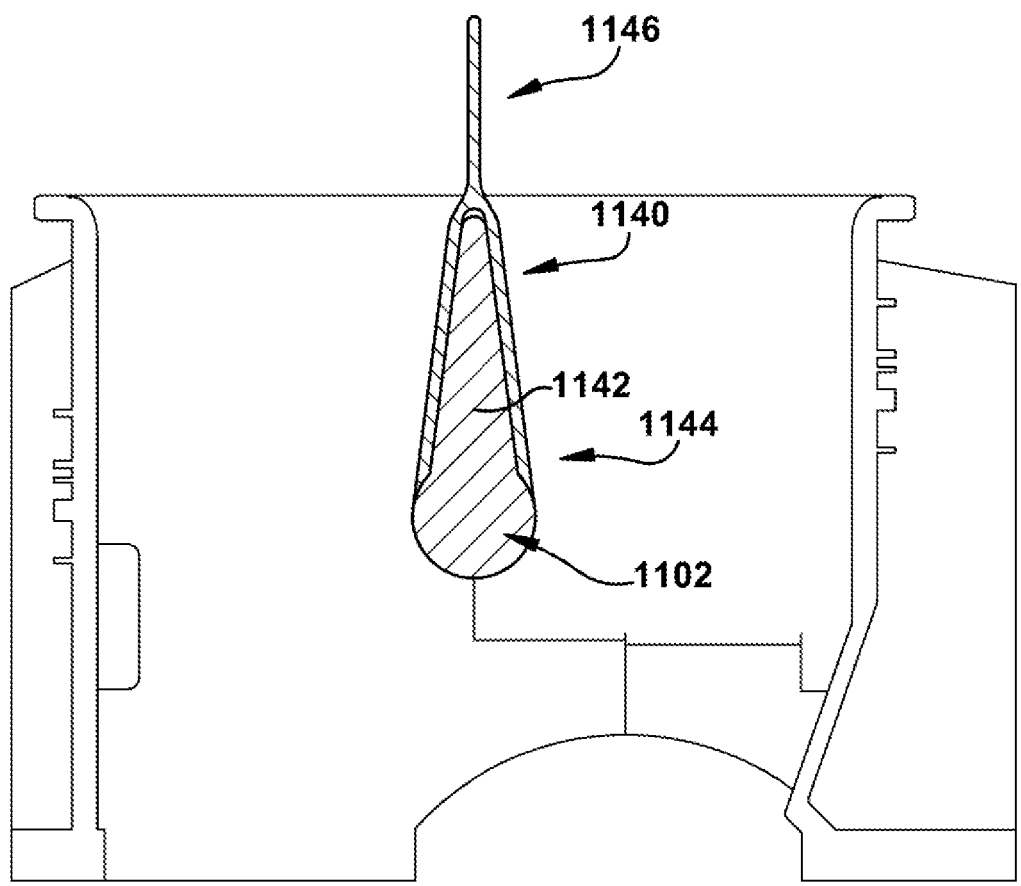
FIG. 12a illustrates a self-compensating run selector device using the flexible valve body member of FIGS. 11a-11c disposed in a neutral position in accordance with an example embodiment.

FIG. 12a shows an embodiment wherein the flexible portion 1147 extending along the edge on the distal end 1146 of the valve body member 1142 has the same flexibility characteristic relative to the remainder of the valve body member as described above, wherein under a selected force the valve body member 1142 may be urged to a left or right positions as viewed in the Figure having an orientation of an arbitrary angle relative to a sidewall of the valve housing 210 upon first contact. A neutral angle of orientation of about 90° relative to a sidewall of the valve housing 210 is used in the drawing Figure as an example of a representative arbitrary angle relative to a sidewall of the valve housing 210.

Figure 12B:
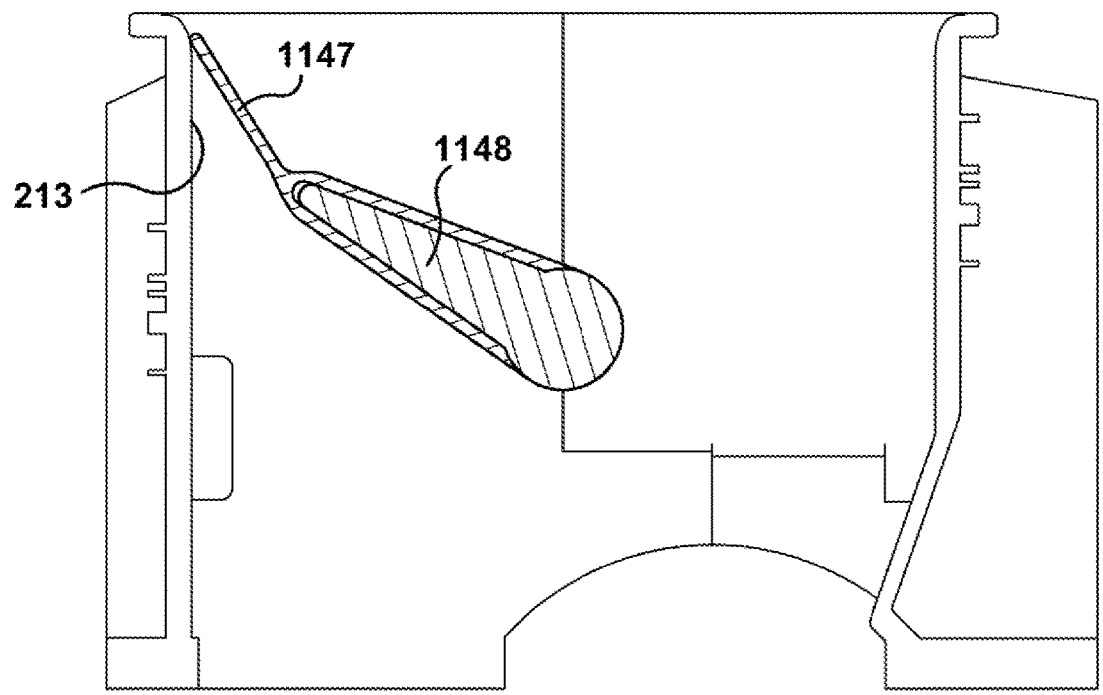
FIG. 12b illustrates the self-compensating run selector device of FIG. 12a using the flexible valve body member of FIGS. 11a-11c disposed in a first commodity run selection position in accordance with an example embodiment.

FIG. 12b shows an embodiment wherein the flexible portion 1147 extending along the edge on the distal end 1146 of the valve body member 1142 has a different than the flexibility characteristic of the distal end 1146 of the valve body member 1142 as described above, wherein under a selected force the valve body member 1142 may be urged to a position having an minimum interference of a first amount relative to a sidewall of the valve housing 210. An orientation of about 23° relative to a sidewall 213 of the valve housing 210 is used in the drawing Figure as an example of a representative angle established relative to the sidewall of the valve housing 210 in the minimum interference mode of operation in accordance with an example embodiment.

Figure 12C:
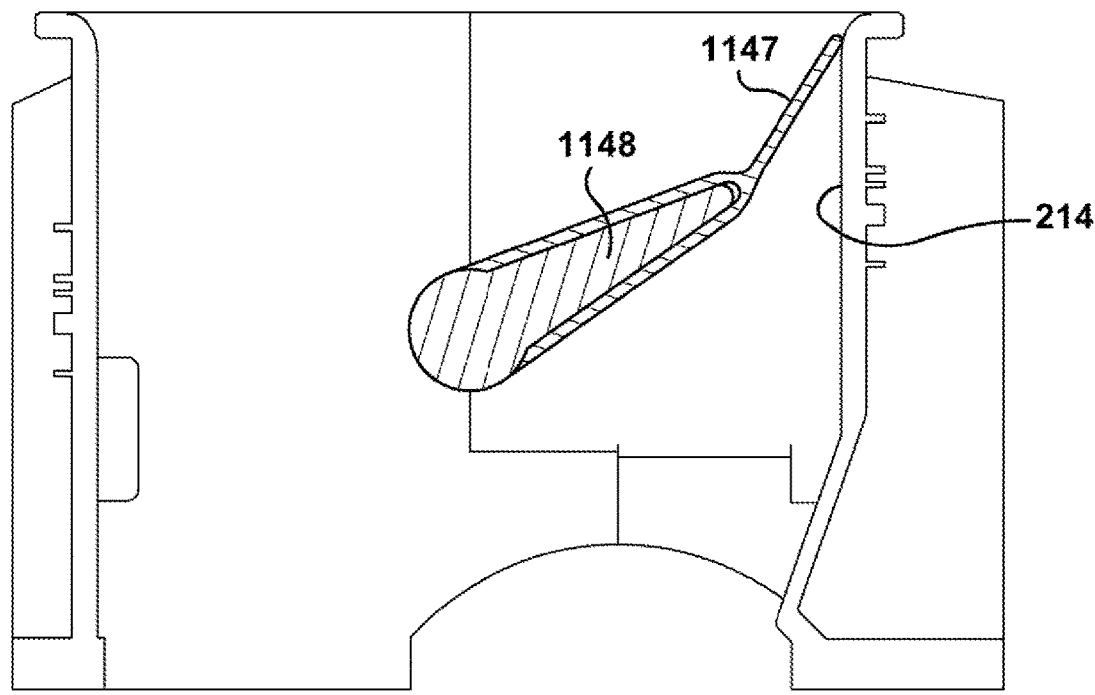
FIG. 12c illustrates the self-compensating run selector device of FIG. 12a using the flexible valve body member of FIGS. 11a-11c disposed in a second commodity run selection position opposite the first commodity run selection position in accordance with an example embodiment.

FIG. 12c shows an embodiment wherein the flexible portion 1147 extending along the edge on the distal end 1146 of the valve body member 1142 has a different than the flexibility characteristic of the distal end 1146 of the valve body member 1142 ascribed above, wherein under a selected force the valve body member 1142 may be urged to a position having a nominal interference of a second amount. An orientation of about 25° relative to the opposite sidewall 214 of the valve housing 210 is used in the drawing Figure as an example of a representative angle established relative to a sidewall of the valve housing 210 in the nominal interference mode of operation in accordance with an example embodiment.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A biasing system for use with an associated run selector device having a valve member movable within a housing between opposite first and second run selection positions selecting respective first and second commodity distribution runs of the associated run selector device, the biasing system comprising:
a first biasing element on the housing of the associated run selector device; and
a second biasing element on the valve member of the associated run selector device,
wherein the first and second biasing elements are movable relative to each other between opposite first and second biasing system positions together with the associated valve member being moved relative to the housing between the opposite first and second run selection positions,
wherein the first and second biasing elements are mutually biased against each other to urge each other apart and towards a one or the other of the opposite first and second biasing system positions.

2. The biasing system according to claim 1, wherein:
a first one of the first and second biasing elements comprises a bendable resilient member and the other one of the first and second biasing elements comprises an engagement surface; and
the bendable resilient member and the engagement surface are mutually biased against each other to urge each other towards a one or the other of the opposite first and second biasing system positions thereby urging the associated valve member towards a corresponding one or the other of the opposite first and second run selection positions.

3. The biasing system according to claim 2, wherein:
the first biasing element comprises a spring member coupled with the housing of the associated run selector device; and
the second biasing element comprises a cam element on or otherwise coupled with the valve body member of the associated run selector device,
wherein the spring member and the cam element are mutually biased against each other to urge each other towards a one or the other of the opposite first and second biasing system positions thereby urging the valve body member of the associated run selector device to a corresponding one or the other of the opposite first and second run selection positions.

4. The biasing system according to claim 2, wherein:
the first biasing element comprises a raceway on or otherwise coupled with the housing of the associated run selector device; and
the second biasing element comprises a spring member coupled with the valve body member of the associate run selector device,
wherein the raceway and the spring member are mutually biased against each other to urge each other towards a one or the other of the opposite first and second biasing system positions thereby urging the valve body member of the associated run selector device to a corresponding one or the other of the opposite first and second run selection positions.

5. The biasing system according to claim 1, wherein:
one or both of the first and second biasing elements comprise a compression spring assembly disposed in compression between the first and second biasing elements;
the first biasing element comprises:
a first fastening member on the housing of the associated run selector device, the first fastening member being pivotally connected with a first end of the compression spring assembly; and
the second biasing element comprises:
a second fastening member on the valve of the associated run selector device, the second fastening member being pivotally connected with a second end of the compression spring assembly,
wherein the compression spring assembly biases the first and second biasing elements mutually against each other to urge the first and second biasing elements towards a one or the other of the opposite first and second biasing system positions thereby urging the valve body member of the associated run selector device to a corresponding one or the other of the opposite first and second run selection positions.

6. The biasing system according to claim 1, wherein:
a first one of the first and second biasing elements comprises a compression spring assembly disposed in compression between the first and second biasing elements, the compression spring assembly comprising:
a compression spring member having opposite first and second ends; and
a raceway block operatively coupled with the second end of the compression spring member;
the first one of the first and second biasing elements comprises a fastening member operatively coupling the first end of the compression spring member with the housing of the associated run selector device;

the other one of the first and second biasing elements comprises a cam member having a cam surface configured to engage the raceway block of the compression spring assembly;

engagement between the raceway block of the compression spring assembly and the cam surface of the cam member biases the first and second biasing elements mutually against each other to urge the first and second biasing elements towards a one or the other of the opposite first and second biasing system positions thereby urging the valve body member of the associated run selector device to a corresponding one or the other of the opposite first and second run selection positions.

7. The biasing system according to claim 1, wherein:
the first biasing element comprises:
   a first contoured surface defined on the housing of the associated run selector device, the first contoured surface defining a first pattern on the housing of the associated run selector device;
the second biasing element comprises:
   a spring system rotatably carried with the valve body member of the associated run selector device for movement relative to the housing of the associated run selector device, the spring system comprising a wave spring disposed in compression between opposite first and second end members;
the first end member of the spring system defines a second contoured surface having a second pattern, the first and second contoured surfaces being configured to engage each other, and the first and second patterns being substantially opposite to each other; and
the first and second contoured surfaces are biased against each other by the wave spring disposed in compression to urge the first and second biasing members towards a one or the other of the opposite first and second biasing system positions thereby urging the valve body member of the associated run selector device to a corresponding one or the other of the opposite first and second run selection positions.

8. A run selector system comprising:
a housing having an input port and first and second output ports;
a valve member disposed in the housing, the valve member comprising a valve body member moveable between opposite first and second run selection positions relative to the housing, the valve body member in the first run selection position relative to the housing defining a first fluid circuit comprising the input port opened to the first output port and closed to the second output port, and the valve body member in the second run selection position relative to the housing defining a second fluid circuit comprising the input port closed to the first output port and opened to the second output port;
an interface device; and
a control arm member operatively coupled with the valve body member by the interface device for moving the valve body member between the first and second run selection positions relative to the housing, the control arm member being movable between opposite first and second control arm positions corresponding respectively to the first and second run selection positions of the valve body member,
wherein the interface device comprises:
   a first interface element on the valve body member;
   a second interface element on the control arm member; and
   a resilient member disposed between the first and second interface elements, the resilient member being compressible between the first and second interface elements to permit limited relative movement between the control arm member and the valve body member,
wherein the control arm member comprises a crank arm member having opposite first and second ends, the first end of the crank arm member being operatively coupled with an associated elongate drag link member of an associated run selection system, and the second end of the control arm member being coupled with the second interface element of the interface device.

9. The run selector system according to claim 8, wherein:
the resilient member defines a star shaped member having a plurality of radially extending arm members defining a plurality of radially extending slots between the plurality of radially extending arm members; and
each of the first and second interface elements define a plurality of circumferentially spaced apart axially extending bosses configured to extend into the plurality of radially extending slots.

10. The run selector system according to claim 9, wherein:
a width of each of the spaced apart axially extending bosses in a circumferential direction is less than a width of the plurality of radially extending slots of the star shaped member in the circumferential direction to permit limited free movement between the valve member and the control arm member.

11. A run selector system comprising:
a housing having an input port and first and second output ports;
a valve member disposed in the housing, the valve member comprising a valve body member moveable between opposite first and second run selection positions relative to the housing, the valve body member in the first run selection position relative to the housing defining a first fluid circuit comprising the input port opened to the first output port and closed to the second output port, and the valve body member in the second run selection position relative to the housing defining a second fluid circuit comprising the input port closed to the first output port and opened to the second output port;
an interface device; and
a control arm member operatively coupled with the valve body member by the interface device for moving the valve body member between the first and second run selection positions relative to the housing, the control arm member being movable between opposite first and second control arm positions corresponding respectively to the first and second run selection positions of the valve body member,
wherein the interface device comprises:
   a first coupling member on the valve body member;
   a second coupling member on the control arm member; and
   a resilient member,
wherein the control arm member comprises a drag link member operatively coupled with an associated run selection system, wherein the drag link member defines a plurality of slotted openings,
wherein the resilient member is disposed between the first and second coupling members and is compressible between the first and second coupling members to permit limited relative movement between the valve body member and the drag link member.

12. The run selector system according to claim 11, wherein:
the resilient member is disposed in the slotted openings of the drag link member.

13. A run selector device self-compensated for obstructions, comprising:
a valve housing comprising a housing body defining:
an input port for conducting an input fluid flow into the housing body;
a first output port in fluid communication with the input port for conducting the input fluid flow out of the housing as a first output fluid flow;
a second output port in fluid communication with the input port for conducting the input fluid flow out of the housing as a second output fluid flow;
a valve disposed in the housing, the valve defining a valve body having:
a proximal end pivotable about a pivot axis between opposite first and second positions for porting the input fluid flow to the first and second output ports, respectively, of the housing body; and
a distal end sealing the valve body against opposite first and second surfaces of the housing body for the valve body being disposed in the opposite first and second positions, respectively,
wherein the distal end of the valve body comprises a flexible portion extending along an edge of the valve body,
wherein the valve body of the valve is formed of a first material having a first average thickness in a direction transverse to the pivot axis,
wherein the flexible portion of the valve body is formed of the first material having a second average thickness in the direction transverse to the pivot axis that is less than the first average thickness of the valve body.

14. The run selector device according to claim 13, wherein:
the valve body of the valve has a first flexibility characteristic; and
the flexible portion of the valve body has a second flexibility characteristic that is more flexible than the first flexibility characteristic.

15. The run selector device according to claim 13, wherein:
the valve body of the valve is formed of a plastic having a durometer of about 70-100 Shore D; and
the flexible portion of the valve body is formed of a plastic having a durometer of about 40-60 Shore D.

* * * * *